(12) United States Patent
Raj et al.

(10) Patent No.: US 9,978,062 B2
(45) Date of Patent: May 22, 2018

(54) MOBILE TOKENIZATION HUB

(71) Applicants: Thanigaivel Ashwin Raj, Foster City, CA (US); Christian Flurscheim, Walnut Creek, CA (US); Kaushik Subramanian, Fremont, CA (US); Bradley Greene, Burlingame, CA (US); Prasanna Laxminarayanan, San Ramon, CA (US)

(72) Inventors: Thanigaivel Ashwin Raj, Foster City, CA (US); Christian Flurscheim, Walnut Creek, CA (US); Kaushik Subramanian, Fremont, CA (US); Bradley Greene, Burlingame, CA (US); Prasanna Laxminarayanan, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 905 days.

(21) Appl. No.: 14/279,186

(22) Filed: May 15, 2014

(65) Prior Publication Data
US 2014/0344153 A1 Nov. 20, 2014

Related U.S. Application Data

(60) Provisional application No. 61/823,836, filed on May 15, 2013.

(51) Int. Cl.
*G06Q 20/36* (2012.01)
*G06Q 20/38* (2012.01)
(Continued)

(52) U.S. Cl.
CPC ....... *G06Q 20/3821* (2013.01); *G06Q 20/027* (2013.01); *G06Q 20/3223* (2013.01); *G06Q 20/385* (2013.01)

(58) Field of Classification Search
CPC ............ G06Q 20/3821; G06Q 20/385; G06Q 20/3223; G06Q 20/027
(Continued)

(56) References Cited

U.S. PATENT DOCUMENTS

| 5,613,012 A | 3/1997 | Hoffman |
| 5,781,438 A | 7/1998 | Lee |

(Continued)

FOREIGN PATENT DOCUMENTS

| EP | 2156397 A1 | 2/2010 |
| WO | WO2001035304 A1 | 5/2001 |

(Continued)

OTHER PUBLICATIONS

International Search Report and Written Opinion of the International Searching Authority dated Sep. 16, 2014 for PCT Patent Application No. PCT/US2014/038284, 11 pages.
(Continued)

*Primary Examiner* — Calvin L Hewitt, II
*Assistant Examiner* — Dennis G Keritsis
(74) *Attorney, Agent, or Firm* — Kilpatrick Townsend & Stockton LLP

(57) ABSTRACT

Embodiments of the present invention relate to systems and methods for implementing a mobile tokenization hub with a common tokenization capabilities (CTC) module that may provide tokenization for various entities in various contexts. For example, the CTC module can provide and store tokens for mobile payment transactions, transit transactions, digital wallet applications, merchant point of sale (POS) applications, personalization services, and the like.

11 Claims, 23 Drawing Sheets

(51) Int. Cl.
  *G06Q 20/02* (2012.01)
  *G06Q 20/32* (2012.01)
(58) Field of Classification Search
  USPC .......................................................... 705/66
  See application file for complete search history.

(56) References Cited

U.S. PATENT DOCUMENTS

| | | | |
|---|---|---|---|
| 5,883,810 A | 3/1999 | Franklin | |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,044,360 A | 3/2000 | Picciallo | |
| 6,163,771 A | 12/2000 | Walker | |
| 6,227,447 B1 | 5/2001 | Campisano | |
| 6,236,981 B1 | 5/2001 | Hill | |
| 6,267,292 B1 | 7/2001 | Walker | |
| 6,327,578 B1 | 12/2001 | Linehan | |
| 6,341,724 B2 | 1/2002 | Campisano | |
| 6,385,596 B1 | 5/2002 | Wiser | |
| 6,422,462 B1 | 7/2002 | Cohen | |
| 6,425,523 B1 | 7/2002 | Shem Ur | |
| 6,592,044 B1 | 7/2003 | Wong | |
| 6,636,833 B1 | 10/2003 | Flitcroft | |
| 6,748,367 B1 | 6/2004 | Lee | |
| 6,805,287 B2 | 10/2004 | Bishop | |
| 6,879,965 B2 | 4/2005 | Fung | |
| 6,891,953 B1 | 5/2005 | DeMello | |
| 6,901,387 B2 | 5/2005 | Wells | |
| 6,931,382 B2 | 8/2005 | Laage | |
| 6,938,019 B1 | 8/2005 | Uzo | |
| 6,941,285 B2 | 9/2005 | Sarcanin | |
| 6,980,670 B1 | 12/2005 | Hoffman | |
| 6,990,470 B2 | 1/2006 | Hogan | |
| 6,991,157 B2 | 1/2006 | Bishop | |
| 7,051,929 B2 | 5/2006 | Li | |
| 7,069,249 B2 | 6/2006 | Stolfo | |
| 7,103,576 B2 | 9/2006 | Mann, III | |
| 7,113,930 B2 | 9/2006 | Eccles | |
| 7,136,835 B1 | 11/2006 | Flitcroft | |
| 7,177,835 B1 | 2/2007 | Walker | |
| 7,177,848 B2 | 2/2007 | Hogan | |
| 7,194,437 B1 | 3/2007 | Britto | |
| 7,209,561 B1 | 4/2007 | Shankar et al. | |
| 7,264,154 B2 | 9/2007 | Harris | |
| 7,287,692 B1 | 10/2007 | Patel | |
| 7,292,999 B2 | 11/2007 | Hobson | |
| 7,350,230 B2 | 3/2008 | Forrest | |
| 7,353,382 B2 | 4/2008 | Labrou | |
| 7,379,919 B2 | 5/2008 | Hogan | |
| RE40,444 E | 7/2008 | Linehan | |
| 7,415,443 B2 | 8/2008 | Hobson | |
| 7,444,676 B1 | 10/2008 | Asghari-Kamrani | |
| 7,469,151 B2 | 12/2008 | Khan | |
| 7,548,889 B2 | 6/2009 | Bhambri | |
| 7,567,934 B2 | 7/2009 | Flitcroft | |
| 7,567,936 B1 | 7/2009 | Peckover | |
| 7,571,139 B1 | 8/2009 | Giordano | |
| 7,571,142 B1 | 8/2009 | Flitcroft | |
| 7,580,898 B2 | 8/2009 | Brown | |
| 7,584,153 B2 | 9/2009 | Brown | |
| 7,593,896 B1 | 9/2009 | Flitcroft | |
| 7,606,560 B2 | 10/2009 | Labrou | |
| 7,627,531 B2 | 12/2009 | Breck | |
| 7,627,895 B2 | 12/2009 | Gifford | |
| 7,650,314 B1 | 1/2010 | Saunders | |
| 7,685,037 B2 | 3/2010 | Reiners | |
| 7,702,578 B2 | 4/2010 | Fung | |
| 7,707,120 B2 | 4/2010 | Dominguez | |
| 7,712,655 B2 | 5/2010 | Wong | |
| 7,734,527 B2 | 6/2010 | Uzo | |
| 7,753,265 B2 | 7/2010 | Harris | |
| 7,770,789 B2 | 8/2010 | Oder, II | |
| 7,784,685 B1 | 8/2010 | Hopkins, III | |
| 7,793,851 B2 | 9/2010 | Mullen | |
| 7,801,826 B2 | 9/2010 | Labrou | |
| 7,805,376 B2 | 9/2010 | Smith | |
| 7,805,378 B2 | 9/2010 | Berardi | |
| 7,818,264 B2 | 10/2010 | Hammad | |
| 7,828,220 B2 | 11/2010 | Mullen | |
| 7,835,960 B2 | 11/2010 | Breck | |
| 7,841,523 B2 | 11/2010 | Oder, II | |
| 7,841,539 B2 | 11/2010 | Hewton | |
| 7,844,550 B2 | 11/2010 | Walker | |
| 7,848,980 B2 | 12/2010 | Carlson | |
| 7,849,020 B2 | 12/2010 | Johnson | |
| 7,853,529 B1 | 12/2010 | Walker | |
| 7,853,995 B2 | 12/2010 | Chow | |
| 7,865,414 B2 | 1/2011 | Fung | |
| 7,873,579 B2 | 1/2011 | Hobson | |
| 7,873,580 B2 | 1/2011 | Hobson | |
| 7,890,393 B2 | 2/2011 | Talbert | |
| 7,891,560 B2 | 2/2011 | Hammad | |
| 7,891,563 B2 | 2/2011 | Oder, II | |
| 7,896,238 B2 | 3/2011 | Fein | |
| 7,908,216 B1 | 3/2011 | Davis et al. | |
| 7,922,082 B2 | 4/2011 | Muscato | |
| 7,931,195 B2 | 4/2011 | Mullen | |
| 7,938,318 B2 | 5/2011 | Fein | |
| 7,954,705 B2 | 6/2011 | Mullen | |
| 7,959,076 B1 | 6/2011 | Hopkins, III | |
| 7,996,288 B1 | 8/2011 | Stolfo | |
| 8,025,223 B2 | 9/2011 | Saunders | |
| 8,046,256 B2 | 10/2011 | Chien | |
| 8,060,448 B2 | 11/2011 | Jones | |
| 8,060,449 B1 | 11/2011 | Zhu | |
| 8,074,877 B2 | 12/2011 | Mullen | |
| 8,074,879 B2 | 12/2011 | Harris | |
| 8,082,210 B2 | 12/2011 | Hansen | |
| 8,095,113 B2 | 1/2012 | Kean | |
| 8,104,679 B2 | 1/2012 | Brown | |
| RE43,157 E | 2/2012 | Bishop | |
| 8,109,436 B1 | 2/2012 | Hopkins, III | |
| 8,121,942 B2 | 2/2012 | Carlson | |
| 8,121,956 B2 | 2/2012 | Carlson | |
| 8,126,449 B2 | 2/2012 | Beenau | |
| 8,171,525 B1 | 5/2012 | Pelly | |
| 8,196,813 B2 | 6/2012 | Vadhri | |
| 8,205,791 B2 | 6/2012 | Randazza | |
| 8,219,489 B2 | 7/2012 | Patterson | |
| 8,224,702 B2 | 7/2012 | Mengerink | |
| 8,225,385 B2 | 7/2012 | Chow | |
| 8,229,852 B2 | 7/2012 | Carlson | |
| 8,265,993 B2 | 9/2012 | Chien | |
| 8,280,777 B2 | 10/2012 | Mengerink | |
| 8,281,991 B2 | 10/2012 | Wentker et al. | |
| 8,328,095 B2 | 12/2012 | Oder, II | |
| 8,336,088 B2 | 12/2012 | Raj et al. | |
| 8,346,666 B2 | 1/2013 | Lindelsee et al. | |
| 8,376,225 B1 | 2/2013 | Hopkins, III | |
| 8,380,177 B2 | 2/2013 | Laracey | |
| 8,387,873 B2 | 3/2013 | Saunders | |
| 8,401,539 B2 | 3/2013 | Beenau | |
| 8,401,898 B2 | 3/2013 | Chien | |
| 8,402,555 B2 | 3/2013 | Grecia | |
| 8,403,211 B2 | 3/2013 | Brooks | |
| 8,412,623 B2 | 4/2013 | Moon | |
| 8,412,837 B1 | 4/2013 | Emigh | |
| 8,417,642 B2 | 4/2013 | Oren | |
| 8,447,699 B2 | 5/2013 | Batada | |
| 8,453,223 B2 | 5/2013 | Svigals | |
| 8,453,925 B2 | 6/2013 | Fisher | |
| 8,458,487 B1 | 6/2013 | Palgon | |
| 8,484,134 B2 | 7/2013 | Hobson | |
| 8,485,437 B2 | 7/2013 | Mullen | |
| 8,494,959 B2 | 7/2013 | Hathaway | |
| 8,498,908 B2 | 7/2013 | Mengerink | |
| 8,504,475 B2 | 8/2013 | Brand et al. | |
| 8,504,478 B2 | 8/2013 | Saunders | |
| 8,510,816 B2 | 8/2013 | Quach | |
| 8,533,860 B1 | 9/2013 | Grecia | |
| 8,538,845 B2 | 9/2013 | Liberty | |
| 8,555,079 B2 | 10/2013 | Shablygin | |

(56) References Cited

U.S. PATENT DOCUMENTS

| | | |
|---|---|---|
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1* | 2/2003 | Flitcroft .................. G06Q 20/00 705/39 |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0019571 A1 | 1/2004 | Hurwitz et al. |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0146275 A1* | 6/2010 | Slick .................... H04L 9/3271 713/169 |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0235286 A1 | 9/2010 | Moore et al. |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |

(56) References Cited

U.S. PATENT DOCUMENTS

| | | |
|---|---|---|
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0106710 A1 | 5/2011 | Reed et al. |
| 2011/0125597 A1 | 5/2011 | Oder, II |
| 2011/0153437 A1 | 6/2011 | Archer |
| 2011/0153498 A1 | 6/2011 | Makhotin |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0036075 A1 | 2/2012 | Klein et al. |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0136796 A1 | 5/2012 | Hammad et al. |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0086141 A1 | 4/2013 | Saldhana |
| 2013/0091028 A1 | 4/2013 | Oder, II |
| 2013/0103685 A1 | 4/2013 | Preneel et al. |
| 2013/0110658 A1* | 5/2013 | Lyman .................. G06Q 20/20 705/18 |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1* | 6/2013 | Shablygin ............... G06F 21/33 713/185 |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |

(56) References Cited

U.S. PATENT DOCUMENTS

| | | |
|---|---|---|
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | | |
|---|---|---|---|
| WO | WO2004042536 A2 | 5/2004 | |
| WO | WO2006113834 A2 | 10/2006 | |
| WO | WO2009032523 A1 | 3/2009 | |
| WO | 2009112793 A1 | 9/2009 | |
| WO | WO2010078522 A1 | 7/2010 | |
| WO | WO2012068078 A2 | 5/2012 | |
| WO | WO2012098556 A1 | 7/2012 | |
| WO | WO2012142370 A2 | 10/2012 | |
| WO | WO2012167941 A1 | 12/2012 | |
| WO | WO2013048538 A1 | 4/2013 | |
| WO | WO2013056104 A1 | 4/2013 | |
| WO | WO2013119914 A1 | 8/2013 | |
| WO | WO2013179271 A2 | 12/2013 | |

OTHER PUBLICATIONS

EP14797341.6, , "Extended European Search Report", dated Apr. 8, 2016, 7 pages.
Wang, U.S. Appl. No. 62/000,288 (unpublished), Payment System Canonical Address Format, filed May 19, 2014.
Sharma et al., U.S. Appl. No. 62/003,717 (unpublished), Mobile Merchant Application, filed May 28, 2014.
Kalgi et al., U.S. Appl. No. 62/024,426, (unpublished) Secure Transactions Using Mobile Devices, filed Jul. 14, 2014.
Prakash et al., U.S. Appl. No. 62/037,033 (unpublished), Sharing Payment Token, filed Aug. 13, 2014.
Hoverson et al., U.S. Appl. No. 62/038,174 (unpublished), Customized Payment Gateway, filed Aug. 15, 2014.
Wang, U.S. Appl. No. 62/042,050 (unpublished), Payment Device Authentication and Authorization System, filed Aug. 26, 2014.
Gaddam et al., U.S. Appl. No. 62/053,736 (unpublished), Completing Transactions Without a User Payment Device, filed Sep. 22, 2014.
Patterson, U.S. Appl. No. 62/054,346 (unpublished), Mirrored Token Vault, filed Sep. 23, 2014.
Dimmick, U.S. Appl. No. 14/952,514 (unpublished), Systems Communications With Non-Sensitive Identifiers, filed Nov. 25, 2015.
Dimmick, U.S. Appl. No. 14/952,444 (unpublished), Tokenization Request Via Access Device, filed Nov. 25, 2015.
Prakash et al., U.S. Appl. No. 14/955,716 (unpublished), Provisioning Platform for Machine-To-Machine Devices, filed Dec. 1, 2015.
Wong et al., U.S. Appl. No. 14/966,948 (unpublished), Automated Access Data Provisioning, filed Dec. 11, 2015.
Stubbs et al., U.S. Appl. No. 62/103,522 (unpublished), Methods and Systems for Wallet Provider Provisioning, filed Jan. 14, 2015.
McGuire, U.S. Appl. No. 14/600,523 (unpublished), Secure Payment Processing Using Authorization Request, filed Jan. 20, 2015.
Flurscheim et al., U.S. Appl. No. 15/004,705 (unpublished), Cloud-Based Transactions With Magnetic Secure Transmission, filed Jan. 22, 2016.
Flurscheim et al., U.S. Appl. No. 62/108,403 (unpublished), Wearables With NFC HCE, filed Jan. 27, 2015.
Sabba et al., U.S. Appl. No. 15/011,366 (unpublished), Token Check Offline, filed Jan. 29, 2016.
Patterson, U.S. Appl. No. 15/019,157 (unpublished), Token Processing Utilizing Multiple Authorizations, filed Feb. 9, 2016.
Cash et al., U.S. Appl. No. 15/041,495 (unpublished), Peer Forward Authorization of Digital Requests, filed Feb. 11, 2016.
Le Saint et al., U.S. Appl. No. 15/008,388 (unpublished), Methods for Secure Credential Provisioning, filed Jan. 27, 2016.
Kinagi, U.S. Appl. No. 62/117,291 (unpublished), Token and Cryptogram Using Transaction Specific Information, filed Feb. 17, 2015.
Galland et al. U.S. Appl. No. 62/128,709 (unpublished), Tokenizing Transaction Amounts, filed Mar. 5, 2015.
Rangarajan et al., U.S. Appl. No. 61/751,763 (unpublished), Payments Bridge, filed Jan. 11, 2013.
Li, U.S. Appl. No. 61/894,749 (unpublished), Methods and Systems for Authentication and Issuance of Tokens in a Secure Environment, filed Oct. 23, 2013.
Aissi et al., U.S. Appl. No. 61/738,832 (unpublished), Management of Sensitive Data, filed Dec. 18, 2012.
Wong et al., U.S. Appl. No. 61/879,362 (unpublished), Systems and Methods for Managing Mobile Cardholder Verification Methods, filed Sep. 18, 2013.
Powell, U.S. Appl. No. 61/892,407 (unpublished), Issuer Over-The-Air Update Method and System, filed Oct. 17, 2013.

(56) References Cited

OTHER PUBLICATIONS

Powell, U.S. Appl. No. 61/926,236 (unpublished), Methods and Systems for Provisioning Mobile Devices With Payment Credentials and Payment Token Identifiers, filed Jan. 10, 2014.
Petition for *Inter Partes* Review of U.S. Pat. No. 8,533,860 Challenging Claims 130 Under 35 U.S.C. § 312 and 37 C.F.R. § 42.104, filed Feb. 17, 2016, Before the USPTO Patent Trial and Appeal Board, IPR 2016-00600, 65 pages.

\* cited by examiner

MOBILE TOKENIZATION HUB

CROSS-REFERENCES TO RELATED APPLICATIONS

This application is a non-provisional application of and claims priority to U.S. Provisional Application No. 61/823,836 titled "MOBILE TOKENIZATION HUB", filed May 15, 2013, which is herein incorporated by reference in its entirety for all purposes.

BACKGROUND

Embodiments of the invention are directed to the generation, use, management, and protocols surrounding tokens over multiple payment channels using different devices, and in particular, to a mobile tokenization hub.

Increasingly, payments are made using a variety of different channels, including non-traditional payment channels such as mobile devices. At the same time, security and PCI compliance concerns has driven the adoption of tokens and tokenization to limit the exposure of sensitive data (e.g., at merchant systems and/or over the Internet).

Different payment channels may support different types of mobile devices, and different mobile devices may support different types of tokens. Additionally, existing payment infrastructure and transaction entities (e.g., acquirers, issuers, merchants, etc.) may require or expect particular types of payment data to process transactions. However, existing systems do not adequately account for these differences in mobile devices and payment infrastructure to allow for the efficient use and management of different types of tokens.

Embodiments of the invention address these and other problems, individually and collectively.

SUMMARY

Embodiments of the present invention relate to systems and methods for implementing a mobile tokenization hub (also called a "tokenization cloud" or "Visa® tokenization cloud" (VTC)) with a common tokenization capability (CTC) module (or system) that may provide common tokenization between a number of different entities, for a number of different purposes. For example, the CTC module can provide and store tokens for mobile payment transactions, transit transactions, digital wallet applications, merchant point of sale (POS) applications, personalization services, account and token management systems, and the like.

A method, in accordance with an embodiment of the invention, comprises receiving a token request from a mobile device. The method further comprises identifying device information associated with the token request and determining a type of token corresponding to the device information. The method further comprises sending a request for the type of token; receiving a token having the requested type; and returning the token to the mobile device.

A system, in accordance with an embodiment of the invention, comprises a mobile tokenization hub server computer in communication with one or more mobile devices and a CTC module. The mobile tokenization hub server computer comprises a processor and a non-transitory computer readable storage medium including instructions stored thereon which, when executed by the processor cause the processor to implement a method of receiving a token request from a mobile device, identifying device information associated with the token request, determining a type of token corresponding to the device information. The method further comprises sending a request for the type of token to a CTC module configured to communicate with the mobile tokenization hub server computer; receiving a token having the requested type from the CTC module; and returning the token to the mobile device.

A further embodiment of the present invention comprises a method for requesting dynamic identification information. The method comprises receiving a request for dynamic identification information associated with a token from a registered system and transmitting the token to a common tokenization capability module that includes a de-tokenization module that converts the token into an account identifier. The method further comprises receiving the account identifier from the de-tokenization service, transmitting the account identifier to a payment processing network to generate the dynamic identification information, receiving the dynamic identification information from the payment processing network; and transmitting the dynamic identification information to the registered system.

In accordance with an embodiment, tokenization provides a number of advantages, including serving as an additional security layer to sensitive information, such as a PAN and, in effect becomes a substitute to the PAN. Having a substitute to the PAN data has become increasingly important as security breaches have become more prevalent. If a PAN is compromised, a user is typically required to open a new account, migrate account settings, wait to receive a new payment card, etc. However, if a token is compromised, the token can be replaced without impacting the consumer experience. Additionally, by handling tokens, instead of sensitive data, tokenization also serves to lessen the PCI compliance burdens on merchant systems by allowing the merchant to store a proxy to the PAN.

Additionally, centrally providing tokenization services can simplify and standardize the use and provisioning of tokens across a variety of different systems and mobile devices, including for both secure element (SE) and non-secure (non-SE) element mobile payment implementations.

These and other embodiments of the invention are described in further detail below.

DETAILED DESCRIPTION

Figure 1:
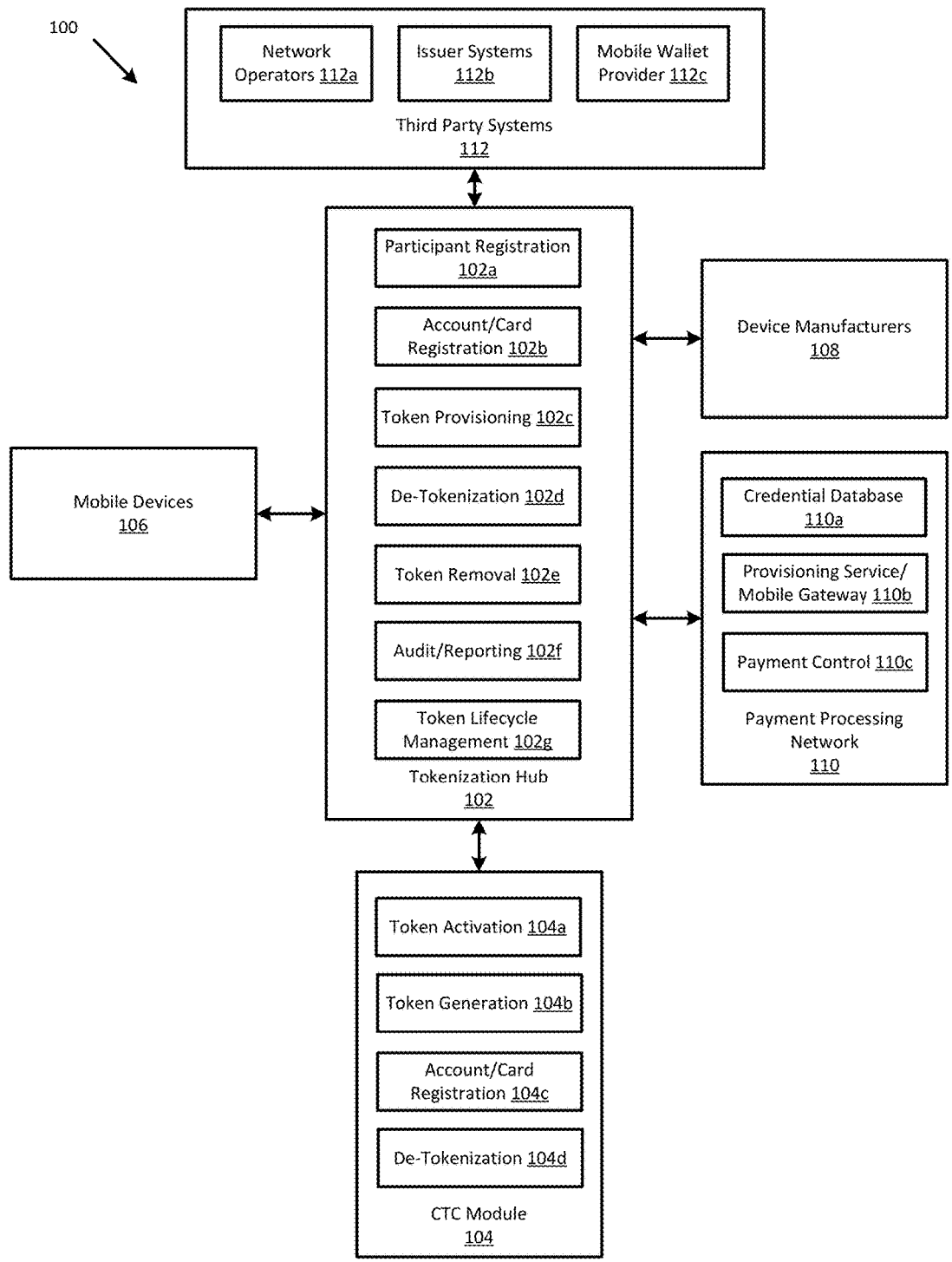
FIG. 1 shows an overview of a system according to an embodiment of the present invention.

The following disclosure may provide exemplary systems, devices, and methods for conducting a financial transaction and related activities. Although reference, may be made to such financial transactions in the examples provided below, embodiments are not so limited. That is, the systems, methods, and apparatuses described herein may be utilized for any suitable purpose.

I. Definitions

Before discussing specific embodiments and examples, some descriptions of terms used herein are provided below.

As used herein, an "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

As used herein, an "authorization system" may refer to a system, a device, or components of a device that may utilize information to determine the probability or likelihood that a transaction is fraudulent. Although the term "merchant processor" may be referred to separately from an "authorization system" in portions of this disclosure, in some embodiments they may comprise one and the same system or systems that may perform substantially the same functionality, but in relation to different components of the system (e.g. providing information to a merchant or an issuer). In some embodiments, authorization systems may quantify the probabilities or likelihood of a fraudulent transaction by generating a "risk score." In some embodiments, the authorization system may approve or reject a transaction. An exemplary embodiment of an authorization system is provided in U.S. Pat. No. 7,809,650 to Bruesewitz et al. entitled "Method and System for Providing Risk Information in Connection with Transaction Processing," which is hereby incorporated by reference in its entirety. It should be understood that embodiments are not so limited.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information related to a payment device (such as account number, CVV values, expiration dates, etc.) may be securely transmitted between the two entities to facilitate a transaction.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

As used herein, an "electronic wallet" or "digital wallet" or "mobile wallet" can store user profile information, payment information (including tokens), bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

As used herein, "identification information" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors).

As used herein, a "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of an exemplary mobile device is provided below.

As used herein, an "online purchase" can be the purchase of a digital or physical item or service via a network, such as the Internet.

As used herein, a "payment account" (which may be associated with one or more payment devices) may refer to any suitable payment account including a credit card account, a checking account, or a prepaid account.

As used herein, a "payment device" may refer to any device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. If the payment device is in the form of a debit, credit, or smartcard, the payment device may also optionally have features such as magnetic stripes. Such devices can operate in either a contact or contactless mode. An exemplary payment device is described below.

The term "transaction data" may include any data associated with one or more transactions. In some embodiments, the transaction data may merely include an account identifier (e.g., a PAN) or payment token. Alternatively, in other embodiments, the transaction data may include any information generated, stored, or associated with a merchant, consumer, account, or any other related information to a transaction. For example, transaction data may include data in an authorization request message that is generated in response to a payment transaction being initiated by a consumer with a merchant. Alternatively, transaction data may include information associated with one or more transactions that have been previously processed and the transaction information has been stored on a merchant database or other merchant computer. The transaction data may include an account identifier associated with the payment instrument used to initiate the transaction, consumer personal information, products or services purchased, or any other information that may be relevant or suitable for transaction processing. Additionally, the transaction information may include a payment token or other tokenized or masked account identifier substitute that may be used to complete a transaction and protect the underlying account information of the consumer.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server. An example of a server computer is described with reference to a Payment Processing Network 26 in FIG. 19.

As used herein, "short range communication" or "short range wireless communication" may comprise any method of providing short-range contact or contactless communications capability, such as RFID, Bluetooth™, infra-red, or other data transfer capability that can be used to exchange data between a payment device and an access device. In some embodiments, short range communications may be in conformance with a standardized protocol or data transfer mechanism (e.g., ISO 14443/NFC). Short range communication typically comprises communications at a range of less than 2 meters. In some embodiments, it may be preferable to limit the range of short range communications (e.g. to a range of less than 1 meter, less than 10 centimeters, or less than 2.54 centimeters) for security, technical, and/or practical considerations. For instance, it may not be desirable for a POS terminal to communicate with every payment device that is within a 2 meter radius because each of those payment devices may not be involved in a transaction, or such communication may interfere with a current transaction involving different financial transaction devices. Typically the payment device or the access device also includes a protocol for determining resolution of collisions (i.e. when two payment devices are communicating with the access device simultaneously). The use of short range communications may be used when the merchant and the consumer are in close geographic proximity, such as when the consumer is at the merchant's place of business.

Embodiments of the present invention relate to systems and methods for implementing a mobile tokenization hub with a common tokenization capability (CTC) module that may provide tokenization services to various entities in various contexts. For example, the CTC module can generate and store tokens for mobile payment transactions, transit transactions, digital wallet applications, merchant point of sale (POS) applications, personalization services, or any other service that may be associated, compatible, or implemented with a token or tokenization. The CTC module can interface with, and provide services to, payment processing network (PPN) systems and/or third party systems that provide and/or consume tokenization services. The mobile tokenization hub may include a service layer, which can connect or communicate with the CTC module to manage tokens and provide common tokenization services to wallet providers, issuer payment applications, and/or PPN reference applications.

Each application or entity may use tokens that are formatted or otherwise customized to that particular application and/or to the user, device, entity, and/or payment channel over which the token is transmitted. For example, a token stored in a secure element of a mobile device may be formatted differently than a token stored on a non-secure element of a different mobile device. Similarly, a token generated by one issuer may use a different numbering scheme than a token generated by a second issuer. This presents a token generation and management challenge to ensure that when a token is requested, the token that is generated and returned is formatted appropriately.

II. Token Format

Embodiments of the invention can provide a token to a number of different systems and the token format may change depending on the type of system, entity, or device requesting a token, the type of token being requested (e.g., static or dynamic), and the context of the token request. For example, a token format for a secure element (SE) device to be used in a transaction can include a token that comprises a static element and a dynamic element. The static element of the token format may comprise a static or non-changing identifier, for example, a primary account number (PAN) substitute (i.e., static account substitute). The dynamic element may be generated using the static element, other consumer account, or device information, or may be received from a third party for one or more transactions.

In some embodiments, tokens may be formatted according to the format of the account identifier the token is being used to substitute. Token format can include any configuration, including 16 or 19 digits and be defined for a particular type, length, uniqueness, and association rules. A token can be associated with a primary account number (PAN), bank identification number (BIN), or product. For example, the token may be a sequence of N numeric or alphanumeric characters, where N is an integer representing the length of the sequence. The value of N may vary depending on the length of the account identifier being substituted. For example a token representing a PAN may be a 19 digit sequence. In some embodiments, the base of the numeric or alphanumeric system may also vary, including binary, decimal, hexadecimal, etc.

In some embodiments, the dynamic element can comprise Track 2 data or be generated using Track 2 data. For example, the Track 2 data can exclude a PAN, but may include a dynamic card verification value (dCVV), cryptographic data, and near-field communication (NFC)/POS data.

Additionally, a token can be static or dynamic, either of which can be used in or associated with payment transactions. For example, if a token is stored on a mobile device, the token may be activated and sent from a mobile device during a payment transaction to initiate the transaction. A static token can have a long lifetime, and may be stored in a secure element (or other secure memory) of a mobile device. In another embodiment, the static token may never expire. A dynamic token can have a shorter lifetime that can be valid until the end of a configured timeline. Once expired, the token may not be reused and reissued. Dynamic tokens can be persisted (i.e., stored) in non-secure element (non-SE) devices (i.e., devices that do not use a secure element to initiate or store a transaction).

In some embodiments, a token can be formatted such that it can be passed to a merchant's POS terminal from a device without making changes in the terminal or requiring changes to message formats supported by the terminal. The terminal may be able to create authorization requests based on the information received from the device, including the token. A token can provide information for printing a receipt, returns, chargeback, and other merchant requirements.

A token can follow a standard format irrespective of the submitting channel and device capability. Examples of some channels and device capabilities can include near-field communication (NFC) and transmitting data via QR Codes.

As described above, the lifecycle of a token can be managed by the tokenization hub. In an embodiment, the token lifecycle can be managed by a CTC module, including processes for creation, re-issuing, or expiration.

A token can comply with other entities' requirements. For example, tokens can comply with requirements from banks (e.g., acquirer or issuer), third parties, international standards (e.g., EMV global standard), or digital wallets. The token may include numerous identifiers, including an issuer bank identification number (BIN), a wallet identifier, or a user account identifier.

A token can support merchant/acquirer checks and satisfy transaction routing decisions to help determine where to send information (e.g., international, national) before, during, or after a transaction. The token can comply with an expiration date check at an acquirer level, fraud checks, and acquirer analytical reporting.

A token can be mapped. For example, the token can correspond or map to a device, wallet, account, card, or consumer. In an embodiment, multiple wallets, multiple devices, and multiple consumers can correspond with one or more tokens. Additionally, multiple devices may map to the same token. In embodiments, a one device to many token mapping or a many device to one token mapping may be available. For example, tokens may be channel specific such that a token may change depending on the request channel for the token, response channel the token is returned to for a transaction, transaction channel in which the token is used to initiate a transaction, etc. Accordingly, a token may change depending on the channel being used and multiple different tokens may be generated from the same underlying data based on the channel used for the token.

In some embodiments, multiple primary account numbers (PANs) can be mapped to a single static token. The mobile tokenization hub can allow the registered entities, including an issuers, wallet provider, or reference applications to register multiple PANs for the same static token using a PAN sequence number (PSN). In some embodiments, the static token can be pre-provisioned in the consumer's device during device manufacturing. The mobile tokenization hub can send the PAN details to the CTC module and capture the PAN generated by CTC for that PAN. The information can be sent to the consumer through issuers, wallet provider, or other reference application.

Multiple devices can support a single PAN. The system can support registration of more than one device for the same consumer and account number in order to facilitate transaction from any of the devices.

A token can be numeric, alphanumeric, hexadecimal, binary, or include any other combination of characters, identifiers, or information that may be used to transfer information. For example, the token can be a 19 digit alphanumeric sequence of digits and characters. In another example, the token can be a known consumer element, like a personal identification number (PIN) or password.

Embodiments of the invention provide several advantages. For example, in a traditional transaction, personal account number (PAN) information is exposed to various elements involved in the transaction lifecycle like wallet providers (payment processing network, issuers, and third party), merchants, gateways, and processors. Introducing tokens in place of actual PAN can reduce the exposure and may minimize security implications for the merchants and wallet providers. This can be beneficial because if a token is compromised, the PAN and/or the underlying financial instrument can remain uncompromised.

III. General Architecture

Embodiments of the present invention relate to systems and methods for implementing a mobile tokenization hub with a common tokenization capabilities (CTC) module that may provide tokenization for various entities in various contexts. For example, the CTC module can provide and store tokens for mobile payment transactions, transit transactions, digital wallet applications, merchant point of sale (POS) applications, personalization services, and the like.

FIG. 1 illustrates a system 100 according to an embodiment of the present invention. As shown in FIG. 1, a mobile tokenization hub 102 can serve as a central provider of a plurality of token-related services, such as 102a-102g, for various entities. For example, the mobile tokenization hub can include modules for account registration, token registration, token provisioning, de-tokenization, token removal, audit/reporting, and token lifecycle management. As described above, tokens can be used in place of account information to more securely conduct transactions (such as mobile payment transactions, transit transactions, etc.) and to remove merchant systems and wallet providers from PCI compliance issues. However, making tokens widely available and simple for consumers to use, requires coordination of many different entities, from issuing banks and payment processing networks to mobile device manufacturers and mobile network operators, each potentially with their own data format, communication, and security requirements. As described herein, mobile tokenization hub 102 can interface with these various entities to manage and coordinate tokens and token services.

To use services offered by the mobile tokenization hub, entities (e.g., consumers, wallet providers, issuers, etc.) can register with the mobile tokenization hub. For example, participant registration module 102a can provide interfaces through which entities can provide registration information and other configuration requirements to integrate with the mobile tokenization hub 102.

In some embodiments, an administration user interface may be implemented to perform the registration and configuration functions for each participant. For example, the interface can help enroll participant systems (e.g., issuer, wallet provider systems) to use the mobile tokenization hub. The interface can also help manage end system public keys to exchange information between mobile devices or partner applications and the mobile tokenization hub. The interface can also help define configuration parameters, which may defined globally or on a participant-by-participant basis, such as time to live (TTL) of tokens, services subscribed to such as token provisioning, account holder registration, credential store, channels, and other services.

In some embodiments, when an entity registers with the mobile tokenization hub, they can be assigned a unique identification number. Participating entities can include an issuing financial institution, PPN-branded wallet, third party wallet provider, third party payment application provider, merchants, or transit authorities providing transit applications.

Participant registration information may be captured by participant registration module 102a to register an entity with the mobile tokenization hub. The information can include client business identifier (BID), partner platform identifier (e.g., generated, sourced), partner platform name, partner platform type (e.g., wallet application, web application), integration type, integration information (e.g., web service connector (WSC) or federated), services subscribed (e.g., token provisioning, account holder registration enrollment, credential store, token life cycle management), and channels enrolled (e.g., NFC, online, etc.).

In some embodiments, participant registration module 102a may also receive and store token transaction configuration information. The system can store the configuration parameters for token generation and provisioning, such as token expiry interval, maximum number of tokens to be provisioned for a given account holder or device combination in a given day, maximum number of tokens to be provisioned to given account holder or device in a single request, and maximum transaction amount allowed for a single token. Each participant may provide different transaction configuration information.

In some embodiments, consumers and/or issuers and wallet providers can register their accounts and mobile devices through one or more interfaces provided by account/card registration module 102b. Account/card registration module 102b can implement registration and enrollment requirements specified by the mobile tokenization hub, CTC module, payment processing network, or other participants. These requirements can include collecting device information and consumer information during registration and enrollment.

In some embodiments, the account/card registration module can provide a service registration interface and/or a client application program interface (API), which can enable the issuer application, wallet application, or PPN reference application to register consumer devices and accounts, request new tokens, deactivate tokens, deregister consumer devices, request token to PAN mapping, or request PAN to token mapping. The API may receive the information for each consumer. The information can include partner platform identifier (a unique identifier registered within the tokenization cloud service enrolled for use of such service), application identifier (a unique identifier as recognized by the initiating application or service within the partner platform), version number, application name, MSISDN, PAN, CVV2, expiry date, and PAN nickname (alias). Other information may include UUID, IMEI, IMSI, or other mobile application identifier (e.g., MAID), OS type/version (e.g., iOS/Android etc.), static token (e.g., for devices having static token stored in secure element), consumer credentials (e.g., last 4 digits of SSN/DOB for consumer account validation), consumer first name, last name, consumer address, ZIP code, and device registration identifier (generated while installing the payment application). A static token may be received if the mobile device has a secure element and the static token is stored in the device.

In some embodiments, account/card registration module 102b can provide an interface for receiving device information, used to uniquely identify each mobile device registered with the mobile tokenization hub. When the participating entity is an issuer, an issuer-provided or PPN-provided wallet application may be used. The system may capture device information during registration and compare it to device information captured during subsequent transactions to confirm the requests are coming from a valid source or a legitimate mobile device owner. If activation request is coming from any third party wallet provider with proper user name and password, then the request may be considered as a legitimate request.

A validation process may be implemented to determine device uniqueness. The system can validate the registration request by verifying the device identifier. If the device identifier is present, the account can be associated to an active token. If the device/account/token combination is active for the same wallet provider/issuer/reference application in the system, then the system may reject the request. The request may be an activation or registration request. The system can send an appropriate message like "device already registered and active" to the requesting application.

In some embodiments, account/card registration module 102b can provide a device deregistration interface that enables issuer/wallet providers to a deregister a consumer device. The device may be deregistered by providing information, including partner platform identifier, application identifier, version, and MSISDN. Other information can be provided as well, including UUID, IMEI, IMSI, and mobile application identifier (MAID).

In some embodiments, account/card registration module 102b can further include an interface to receive account holder information from a participating entity and validate the account holder during registration. In some embodiments, the mobile tokenization hub can validate account holder details by checking the user credentials against the account on the file details provided by an issuer either through a data feed to the payment processing network (PPN) or using a web service message published by the issuer. In some embodiments, participating entities may perform account holder verification, including issuers, PPN branded wallets, and white labeled third party wallet providers. The mobile tokenization hub can support one or more verification methods for the qualified participating entities. One method may include verification of account number, CVV2, expiry date based on data provided to the PPN through file by the participating entity. Another method may be real time web service integration message to the participating entity to verify account holder information including account holder first name, last name and last 4 digits of social security number (SSN) or data of birth (DOB). Another method may be direct verification of the account holder by the issuing financial institution with account holder credentials with an online banking system.

During registration, account holder credential persistence may be provided by account/card registration module 102b. The system may store the consumer's account and device details including user credentials received through the registration process in the credential database 110a by communicating with a credential database registration API for successful activation or registration requests. Account holder credential information can include a partner platform identifier, MSISDN, PAN, CVV2, expiry date, PAN nickname (alias), UUID, IMEI, IMSI, MAID, consumer credentials (e.g., last 4 digits of SSN/DOB for account validation), consumer first name, last name, consumer address, or ZIP code.

In some embodiments, during registration a default account may be designated. For example, the consumer may designate an alias of an account in their payment application as a default account to use in a transaction where no account, or account alias, is selected. In some embodiments, a consumer's default account, or an alias corresponding to that account, can be stored in credential database 110a. When a consumer initiates a transaction without selecting an alias, the payment application (e.g., wallet application, issuer application, or payment processing network reference application) can request a token associated with the default account from the mobile tokenization hub. The mobile tokenization hub can query the credential database 110a for the default account and, if a default is designated, return a corresponding token or to request a new token.

As shown in FIG. 1, mobile tokenization hub 102 can also include a token provisioning module 102c which can enable the mobile tokenization hub 102 to integrate with a provisioning service, such as a mobile provisioning system (VMPS), trusted service manager (TSM), and/or mobile gateway, to securely write token information on a consumer's mobile device's secure element.

In some embodiments, token provisioning module 102c may be configured to provision tokens into the secure element that are generated by an external entity, such as an issuer or wallet provider systems, once the tokens have been received and registered by the CTC module 104. The mobile tokenization hub can provision the token information in the consumer device's secure element by communicating with a mobile gateway API.

In some embodiments, mobile tokenization hub 102 can also include an audit/reporting module 102f can provide data auditability, reporting, performance, business analytics, and other related services for the mobile tokenization hub 102, CTC module 104, and/or payment processing network 110. The mobile tokenization hub can provide an audit end to end token request and response activity. In some embodiments, the mobile tokenization hub may also provide a transaction logging API. Issuer and/or wallet providers can use the API to provide details of the transactions made by mobile devices to the mobile tokenization hub. The transaction data can be used for loyalty programs. The information may include partner platform identifier, application identifier, MSISDN, transaction identifier, transaction amount, transaction date/time, merchant identifier, merchant name, merchant city, merchant street, merchant country, merchant zip, UUID, IMEI, or merchant address.

In some embodiments, the mobile tokenization hub can provide a periodic report to list the dynamic tokens generated and assigned to the devices and which have not been used and/or have expired. This report can be provided to CTC module and used to recycle tokens as needed. For example, unused tokens may get reassigned to a different application/PAN in the future after they are expired. Information can include a partner platform identifier, application identifier, PAN, and token.

Additionally, in some embodiments, the mobile tokenization hub 102 can publish specification documents and API for external systems (e.g., wallet provider, issuer payment, reference applications) to integrate with the mobile tokenization hub. In an embodiment, the issuer and/or wallet provider can enhance its payment applications by using a client software development kit (SDK) published by the mobile tokenization hub 102 to make a secure connection to the mobile tokenization hub and to use mobile tokenization hub services. Similarly, the issuer and/or wallet provider can also enhance client payment applications (e.g., mobile wallet applications) by using a client SDK to connect to the mobile tokenization hub and request for new tokens while initiating transactions. In some embodiments, integration between the mobile tokenization hub and issuer or wallet provider systems can happen through a web service integration (WSI) infrastructure with dual factor authentication (e.g., user name/password and X509 certification).

As shown in FIG. 1, mobile tokenization hub 102 may communicate with a CTC module 104 that may generate, activate, store, and/or de-tokenize tokens. In some embodiments, CTC module 104 can be implemented on a server computer within a payment processing network. The CTC module 104 can include a plurality of service modules, such as modules for token activation 104a, token generation 104b, card/account registration 104c, and de-tokenization 104d. The CTC module may control the logic behind how the token is generated. In some embodiments, the CTC module can generate a token in response to a request from the mobile tokenization hub 102 and respond with the token back to the mobile tokenization hub which may in turn pass the token to, e.g., a requesting mobile device associated with a consumer, a wallet provider, an issuer system, or other connected system or service. In some embodiments, the CTC module 104 may store tokens generated by a third party, such as an issuer system.

In some embodiments, the mobile tokenization hub may act as an orchestration layer or gateway through which other systems and services can request a token, send a token, establish controls with a token, adjust controls associated with a token, and request other services and/or access other systems. As shown in FIG. 1, the mobile tokenization hub 102 can interface with mobile devices 106 and mobile device manufactures 108, a payment processing network 110, and a plurality of third party systems 112.

Mobile devices 106 can include devices with secure elements, and devices without secure elements. Devices with secure elements may securely store static and/or dynamic tokens within the secure element. Dynamic tokens may be stored in memory on devices that do not include a secure element. Depending on how a dynamic token is stored, different payment controls and lifecycle controls may be applied to the dynamic token. For example, if the dynamic token is stored within mobile OS memory, the token may be generated with a shorter lifespan and be valid for lower value transactions. In some embodiments, multiple tokens may be requested and persisted in a mobile device based on the partner configuration as part of the enrollment. Token lifecycle management may decide when to expire or request a new set of tokens.

In some embodiments, the mobile tokenization hub can receive a request from mobile device manufacturers 108 for a plurality of tokens to be used to pre-provision mobile devices prior to shipment. As described further below, once a consumer purchases a mobile device with a pre-provisioned token, the consumer can send a request through the mobile device to the mobile tokenization hub 102 to activate the token and register a card account with the token. In some embodiments, payment processing network 110 can include a credential database 110a that stores device information for each customer, a provisioning service/mobile gateway 110b that can securely transmit tokens to mobile devices, and a payment control service 110c that can provide lifecycle or other control data for tokens. In some embodiments, a mobile device may not include a pre-provisioned token, and the consumer can send a request to the tokenization hub directly, or through a third party partner, such as a network operator 112a, issuer system 112b (such as an issuer-specific mobile app), and/or a mobile wallet app from a mobile wallet provider 112c.

In some embodiments, payment control module 110c can provide payment controls for tokens to mobile tokenization hub 102. Payment control module 110c may define payment controls, such as to set amount rule to accept exact transaction amount, the merchant category code (MCC) rule or time rule. Mobile tokenization hub 102 may maintain the payment control rules in token lifecycle management module 102g and pass the payment control rules to CTC module 104. Payment control rules may include one or more of a partner platform identifier, application identifier, token, payment control type, value or operation (e.g., add, delete, update). In some embodiments, the mobile tokenization hub 102 can associate a payment controls with a token for a particular amount of time. The payment control may expire when the token expires.

In some embodiments, the credential store can provide an API to allow applications to register or add consumer device/account details, edit consumer device/account details, delete consumer device/account details, or retrieve consumer device/account details. The API can allow applications to store consumer device, account, and credential details. The API may be able to receive information for each consumer. The information can include an application identifier, application name, partner platform identifier, MSISDN, UUID, IMEI, IMSI, static token/dynamic token, PAN, CVV, consumer first name, last name, consumer address, ZIP Code, or consumer credentials. The credential database can be PCI compliant and implement security standards.

The API can also enable applications to edit/update consumer account/device details by providing an application identifier, IMEI, MSISDN, or PAN. An application can delete consumer account/device details by providing application identifier, IMEI, MSISDN, or PAN. The application may also retrieve consumer account/device details by providing application identifier, IMEI, MSISDN, or PAN.

In some embodiments, the mobile tokenization hub may be implemented on a cloud server or a plurality of servers in a cloud environment. Secure communication between applications, transaction entities, and the mobile tokenization hub 102 can be effected through a secure connection (e.g., secure sockets layer (SSL), transport security layer (TSL)). In some embodiments, the mobile tokenization hub can support multiple tokenization cloud instances configured to run in parallel to improve performance and/or to serve different geographical locations. The mobile tokenization hub can provide an interface to internal/external applications to request all the tokens and their attributes assigned for a given PAN and from a given date. Information can include a partner platform identifier, application identifier, PAN, and from date. The mobile tokenization hub can provide an interface to internal/external participating applications to request details for a specific token and PAN combination, such as attributes assigned. The mobile tokenization hub can provide an interface for registered internal/external applications to request authorization and settlement data for a given token/PAN combination and date range.

Figure 2:
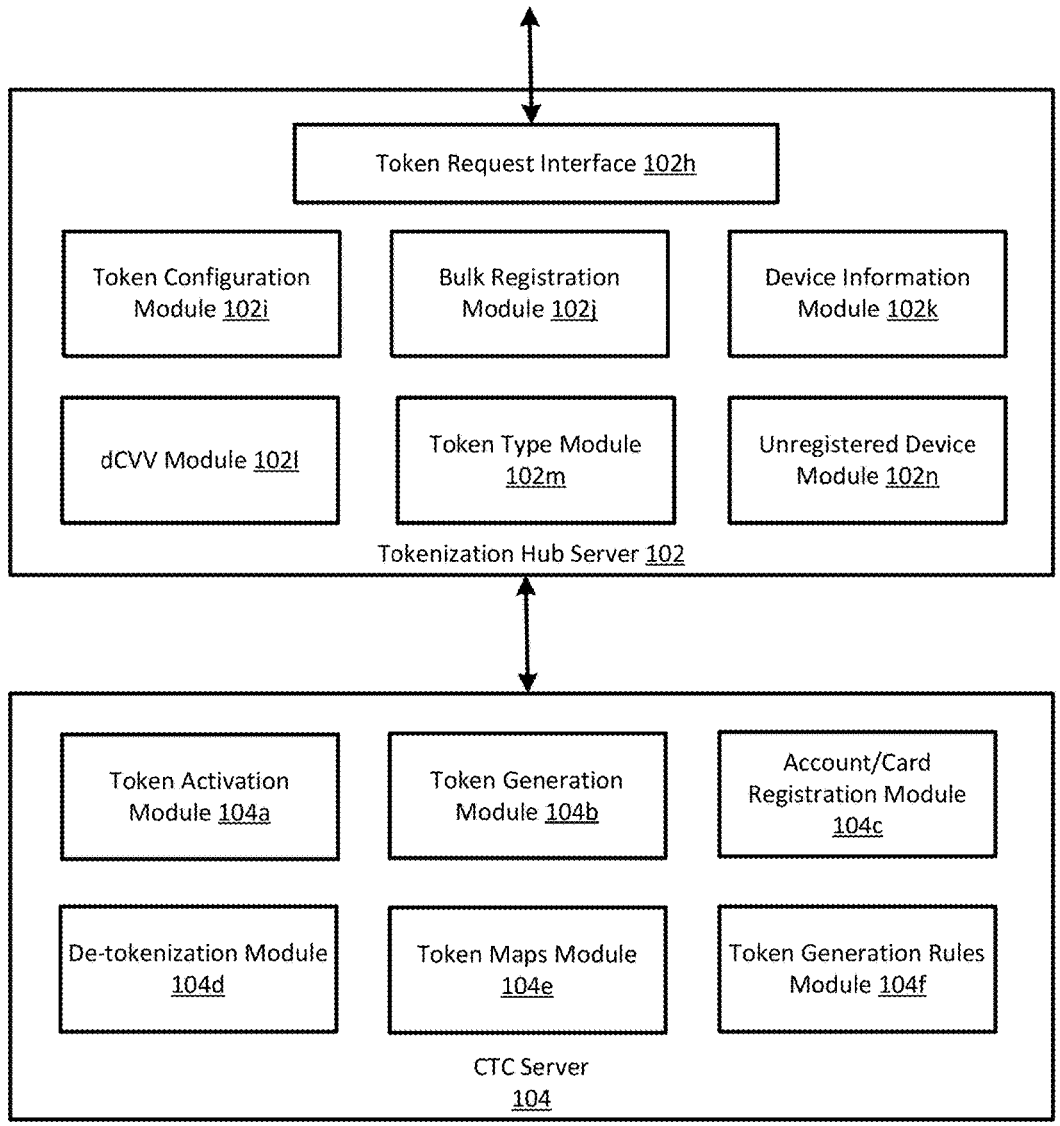
FIG. 2 shows a block diagram of a mobile tokenization hub and common token capability module according to an embodiment of the present invention.

FIG. 2 shows a block diagram of a mobile tokenization hub and common token capability module according to an embodiment of the present invention. As shown in FIG. 2, in addition to the modules shown in FIG. 1, a mobile tokenization hub server may include additional modules, such as a token request interface 102h. Token request interface 102h can receive token requests from consumers, issuers, wallet applications, and/or other payment processing network services and/or third party services. Token requests can include: requests to generate a new token, requests to register or update an existing token, requests to de-tokenize a token, requests to generate dynamic identification information (dCVV), and other token-related requests.

In some embodiments, the token request interface 102h may allow the issuer/wallet provider to specify configuration details for tokens. The token request interface 102h can receive a token configuration file associated with a particular consumer, a set of consumers, and/or a service provider. The token request interface 102h can pass the token configuration file to a token configuration module 102i which can parse the token configuration file and store the token configuration settings in a credential database or other storage system. When a token request is received, the mobile tokenization hub may look up the requestor in the credential database to identify token configuration settings associated with the requestor. In some embodiments, the token configuration settings can include:

How many new tokens are to be assigned to a given consumer's account/device on each token request (e.g. 1 to 5 to allow a consumer to make a purchase even in the absence of a data connection);

Auto assignment of new tokens once the available active tokens reaches certain limit on a device;
Validity time frame for each token;
Token validity time period for low ticket transactions (e.g., 1 day or 3 days etc.);
Token validity for high ticket transactions (e.g., only once, not more than once in 6 hours, once per day); or
Low ticket/high ticket limits (e.g., less than $1000, greater than $3000).

As described further below, in some embodiments, mobile tokenization hub 102 can receive a bulk registration file from a service provider (such as a wallet provider or issuer) to register a plurality of existing consumers with the mobile tokenization hub. The token request interface 102h can receive the bulk registration file and send the bulk registration file to a bulk registration module 102j, which parses the bulk registration file to identify consumers included in the file and to determine a type of token or tokens to be generated for each consumer in the bulk registration file. In some embodiments, the bulk registration file may include token configuration settings or may include a pointer to a token configuration settings file provided previously, or concurrently with, the bulk registration file. The mobile tokenization hub can then send requests to the CTC module 104 to generate tokens according to the bulk request file and the token configuration file.

In some embodiments, tokens may be distributed in response to bulk token requests without assigning a PAN (PAN-less tokens) to the tokens. The tokens can be distributed to device manufacturers which can preconfigure the tokens in the mobile devices during manufacturing. The CTC module may maintain each of these PAN-less tokens in an inactive state until an activation request from the mobile tokenization hub request is received. Token activation module 104a, may then activate the tokens according to the activation request. In some embodiments, the CTC module may deactivate or disable a token on a request from the mobile tokenization hub.

In some embodiments, device information module 102k can receive mobile device information during registration and interface with credential database 110a to store the device information. The device information can be associated with a consumer and with any tokens that are associated with the consumer. As described above, device information that may be received during registration can include an application identifier, application name, partner platform identifier, MSISDN, UUID, IMEI, IMSI, static token/dynamic token, PAN, CVV, consumer first name, last name, consumer address, ZIP Code, and/or consumer credentials. The device information may also includes a device type identifier which may indicate whether the device includes a secure element.

In some embodiments, a dCVV module 102l can generate a dCVV value for a token. The mobile tokenization hub 102 can receive a request from a registered system for a dCVV value for a token. The mobile tokenization hub send a request to the CTC module 104 to de-tokenize the token (using de-tokenization module 104d) and return the corresponding PAN. The dCVV module 102l can then generate a dCVV value for the PAN and return the dCVV value to the registered system. In some embodiments, the dCVV module 102l can send a request to a payment processing network to generate a dCVV based on the de-tokenized PAN.

In some embodiments, dCVV module 102l may be configured to generate other types of identification information, such as a pseudo card security code (CVV2) and expiration date for the token during a token request. Both the CVV2 and expiration date can be provided to the requesting application and the CTC module. The requesting application or its user can use the token, CVV2, and expiry date to make the transaction and CTC can validate the values with the mobile tokenization hub provided values during de-tokenization. The mobile tokenization hub can also de-tokenize the identification information to obtain the real CVV2 and expiration date values corresponding to the PAN, which may be provided to the issuer for authentication.

Mobile tokenization hub 102 can include a token type module 102m that is configured to identify the type of token requested (e.g., static or dynamic) based on the source of the token request. For example, based on device information stored in the credential database 110a, the token type module can determine if the requesting device is a mobile device with a secure element or a mobile device without a secure element. If the request originates with a mobile device with a secure element, then static tokens can be generated to provision into the secure element. If the requesting device does not include a secure element, a dynamic token with a predetermined time to live (TTL) value can be generated. In some embodiments, during the set time limit, the device can initiate any number of transactions using the assigned dynamic token. If the request comes from another internal or external system, the token type can be decided based on configuration setup during a partner registration.

In some embodiments, an unregistered device module 102n can detect that a consumer's account has been installed on multiple devices, but each device has not been registered. For example, a consumer may install a mobile wallet app on their smartphone and register the smartphone and a payment account with the mobile tokenization hub 102. The same consumer may subsequently install the mobile wallet app on their tablet computer. If the consumer then attempts to perform a transaction using the mobile wallet app on the tablet computer, the device information provided with the transaction data will not match the registered device information. The unregistered device module can then return a message to the consumer through the tablet computer prompting the user to register the tablet computer before the transaction can be completed.

Token generation module 104b may generate tokens in response to a request from the mobile tokenization hub. In some embodiments, the token generation module 104b can select the token from a numbering scheme and activate the token. For example, with a static token, then the CTC module can create an association between the token and one or more account identifiers. With a dynamic token, the CTC module can set controls and make a pairing available to a payment processing network in order to complete the transaction processing. The CTC module can assist with de-tokenization during a transaction authorization using a de-tokenization module 104d.

In some embodiments, token maps module 104e can maintain token to PAN mappings for consumers registered with the mobile tokenization hub. As described above, the mappings can include many tokens to one PAN as well as many PANs to one token. In some embodiments, token maps module 104e can maintain mappings for externally generated tokens as well. For example, when mobile tokenization hub 102 receives a token generated by, e.g., an issuer, through token request interface 102h, the externally generated token may be forwarded to CTC module 104. Token maps module 104e can update its token mappings for the corresponding consumer to include the externally generated token. In some embodiments, an externally generated token may be accompanied by one or more of a partner platform identifier, application identifier, version, PAN, or token attributes. The system can register the tokens in CTC system by communicating with a CTC registration API and send the response back to the issuer or wallet provider application.

In some embodiments, token generation rules module 104f can receive rules from a registered system for generating tokens. For example, the rules may include a type of token, a format of the token, security and storage requirements for the token. In some embodiments, token generation rules module may include payment control rules that are to be automatically associated with newly generated tokens. In some embodiments, each registered entity can maintain a set of rules that are commonly used when requesting new tokens. For example, an issuer may request tokens be generated of a particular length with a particular range of BINs.

Figure 3:
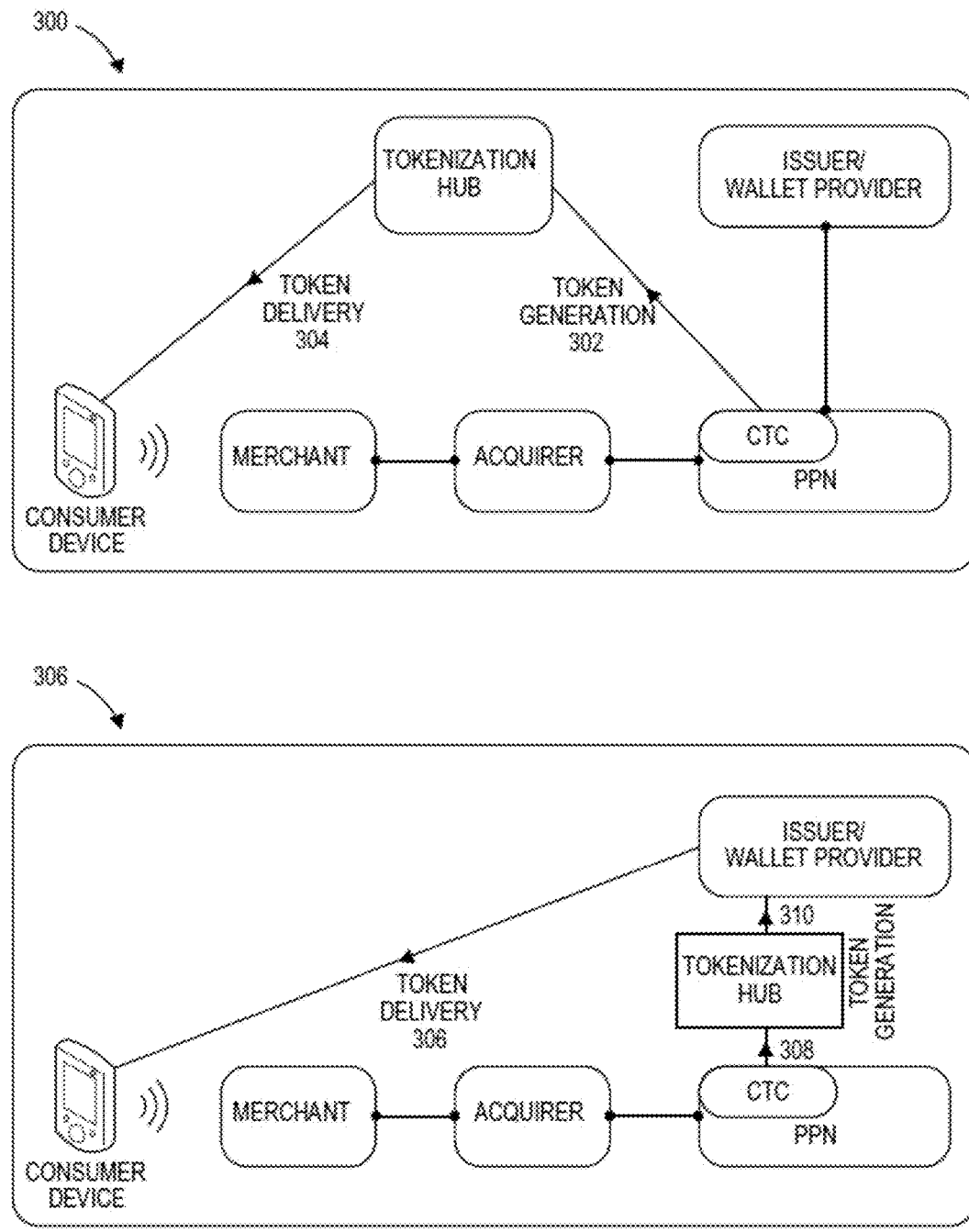
FIG. 3 shows example processes of token generation and provisioning according to an embodiment of the present invention.

FIG. 3 shows example processes of token generation and provisioning according to an embodiment of the present invention. As shown in FIG. 3, tokens can be generated by CTC module 104 and then provisioned to mobile devices 106. In some embodiments, the CTC module can generate the token in response to a token request associated with a mobile device. Depending on the type of mobile device associated with the request, the mobile tokenization hub can request a different type of token. For example, in system 300, CTC module 108 can generate and send 302 a token to mobile tokenization hub 102 to be delivered 304 (i.e., provisioned) to a mobile device. As described above, the mobile tokenization hub can include a token provisioning module that enables the mobile tokenization module to directly provision the token to a mobile device, or to interface with a mobile gateway or a trusted service manager (TSM) system to provision the token to the mobile device. Any other provisioning methods may be implemented.

System 306 shows a process of token generation and provisioning in a mobile device according to another embodiment of the present invention. As described above, the token can be generated by the CTC module 104 in response to a request from mobile tokenization hub, issuer, and/or mobile wallet provider and can be generated based on rules established by the requesting entity and/or by the payment processing network. For example, an issuer and/or wallet provider can send a request to the mobile tokenization hub through an application programming interface (API) to receive token information (e.g., to receive a token that has already been generated or to request a new token be generated). The issuer and/or wallet provider can then provision the token(s) to the mobile device directly, or through a trusted service manager server (TSM).

In some embodiments, the payment processing network, mobile tokenization hub, CTC module, and issuer can have various roles and responsibilities. For example, account registration can be managed by the payment processing network (PPN) and/or mobile tokenization hub. Token generation can be managed by the PPN and/or CTC module. Token provisioning can be managed by the PPN and/or mobile tokenization hub. Token lifecycle management can be managed by the PPN and/or mobile tokenization hub. Token mapping can be managed by the PPN and/or CTC module. Dispute resolution can be managed by the issuer. Device and/or account holder data persistence can be managed by the PPN and/or stored credential database (SCD).

Figure 4:
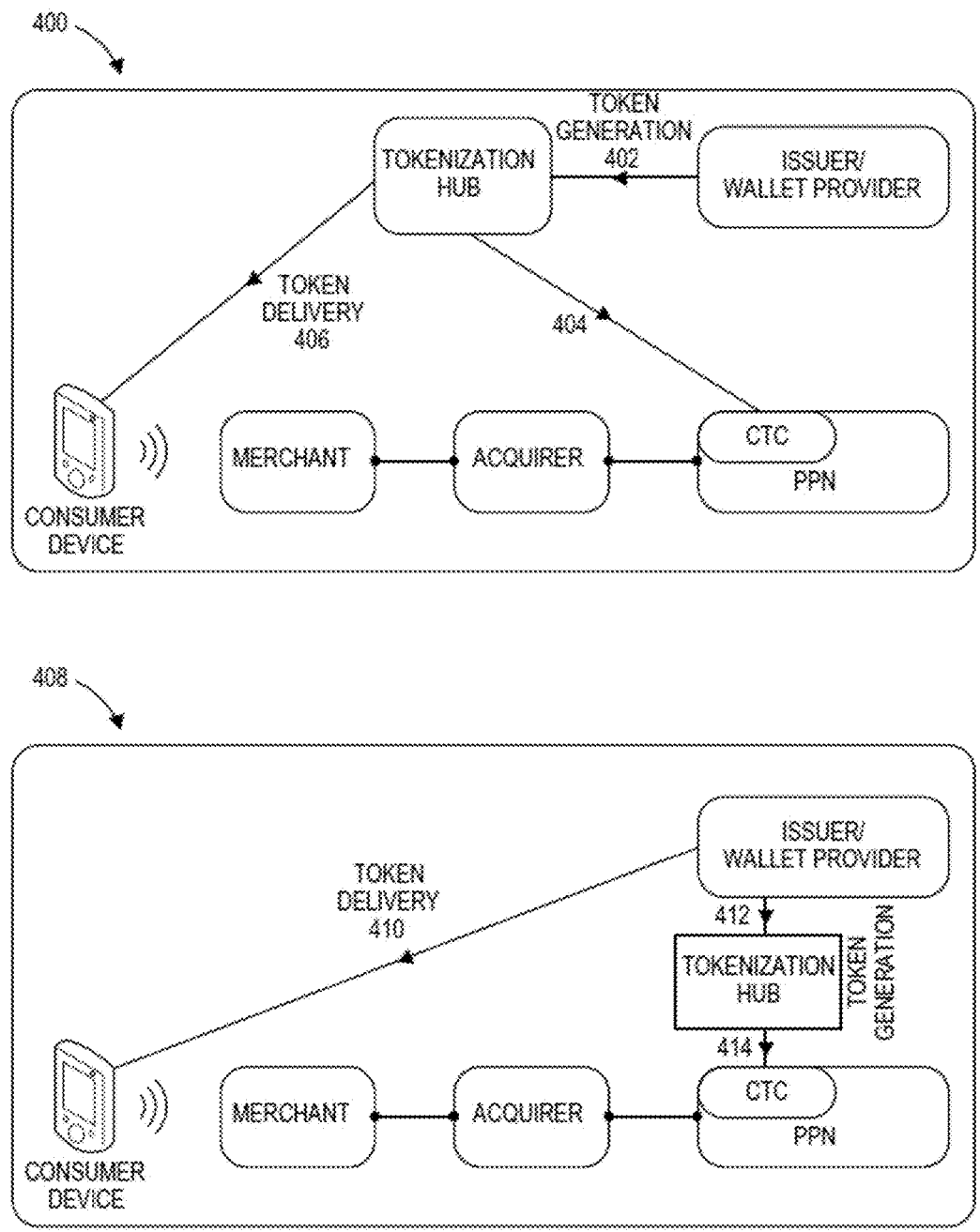
FIG. 4 shows a process of token generation and provisioning according to an embodiment of the present invention.

FIG. 4 shows a process of token generation and provisioning according to an embodiment of the present invention. As shown in system 400, the issuer and/or wallet provider may generate and send 402 a token to a mobile tokenization hub. The issuer and/or wallet provider can instruct the mobile tokenization hub service to provision 406 the tokens to the mobile device. The issuer and/or wallet provider can also request to register the token with the CTC module using the mobile tokenization hub API to provide registration information for the tokens. In some embodiments, the registration information can include one or more of a partner platform identifier, version number, primary account number (PAN), token, and/or token attributes.

In some embodiments, the payment processing network, mobile tokenization hub, CTC module, and issuer can have various roles and responsibilities. For example, account registration can be managed by the issuer. Token generation can be managed by the issuer. Token provisioning can be managed by the PPN and/or mobile tokenization hub. Token lifecycle management can be managed by the issuer. Token mapping can be managed by the PPN and/or CTC module. Dispute resolution can be managed by the issuer. Device and/or account holder data persistence can be managed by the issuer.

Alternatively, or additionally, as shown at 408, the issuer and/or wallet provider can generate and provision 410 tokens to mobile device(s) through a trusted service manager server (TSM), mobile gateway, or other provisioning service. The issuer and/or wallet provider may also send 412 a copy of the token to the mobile tokenization hub to be stored 414 in the CTC module data store. When the issuer and/or wallet provider requests to store a copy of the token in the CTC module, the issuer and/or wallet provider can provide registration information to register tokens with the CTC module. The registration information can include one or more of a partner platform identifier, version number, PAN, token, and/or token attributes.

In some embodiments, the payment processing network, mobile tokenization hub, CTC module, and issuer can have various roles and responsibilities. For example, account registration can be managed by the issuer. Token generation can be managed by the issuer. Token provisioning can be managed by issuer. Token lifecycle management can be managed by the issuer. Token mapping can be managed by the PPN and/or CTC module. Dispute resolution can be managed by the issuer. Device and/or account holder data persistence can be managed by the issuer.

IV. Token Generation and Provisioning

As described above, not all token requests may request the same type of token. For example, a token request from a mobile device with a pre-provisioned token in its secure element may be an activation request, whereas a mobile device that has not be pre-provisioned may request a new token. The mobile tokenization hub can determine whether the device contains a secure element (SE) or non-secure element (non-SE), and alter the processing based on that determination. For mobile devices with a secure element, the token requests may be for static tokens that may be usable for an extended period of time, while a token request from a mobile device without a secure element may be for a dynamic token that is limited in how long it is active or the types or amounts of transactions for which it may be used. Also, depending on how the token will be used, the token itself may be formatted differently. For example, a transit token may have one format while a token for a credit card account may have a different format. As described further below, embodiments of the present invention may determine the appropriate token to generate and provision to fulfill a given request. This simplifies the process for requesting tokens and makes it easier for consumers and partner systems to obtain and use tokens in more processes.

Figure 5:
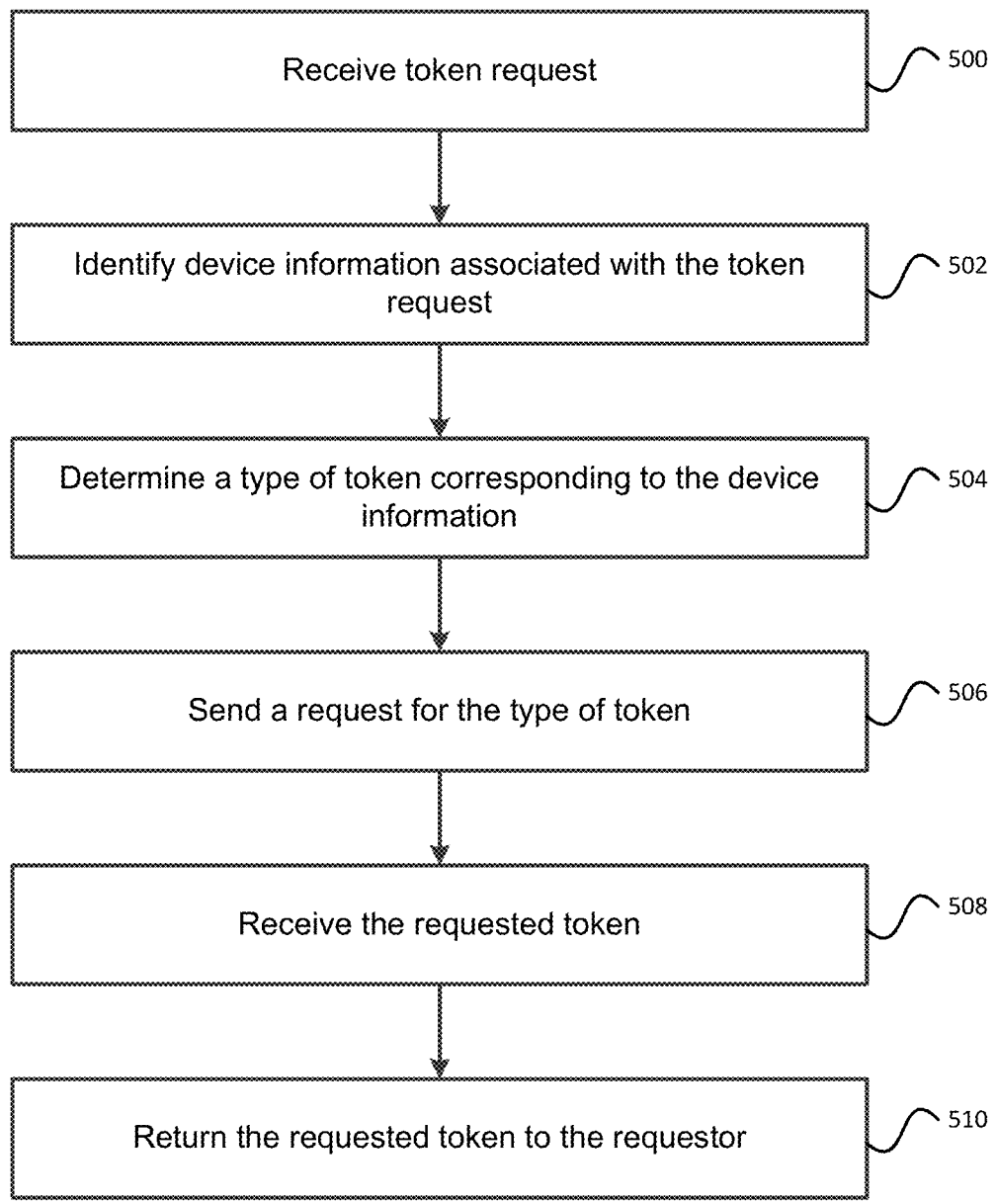
FIG. 5 shows a method of provisioning tokens for different types of mobile devices according to an embodiment of the present invention.

FIG. 5 shows a method of provisioning tokens for different types of mobile devices according to an embodiment of the present invention. At step 500, a token request is received by the mobile tokenization hub. Embodiments of the invention can provide different processing and treatment of data from mobile devices, including non-secure element (non-SE) mobile devices and secure element (SE) mobile devices. The processing can be differentiated at a central entity, such as a payment processing network (e.g., Visa®), mobile tokenization hub, or any other entity in a transaction flow.

At step 502, device information associated with the token request can be identified. For example, when a token request is initiated, a payment application on the mobile device can capture device information and include the device information with the token request to the mobile tokenization hub. Additionally, or alternatively, device information corresponding to the requesting device may be stored in a credential database, for use in validating subsequent transactions. In some embodiments, the credential database can be queried to determine device information associated with the token request.

At step 504, the mobile tokenization hub can determine a type of token corresponding to the device information. For example, the credential database can differentiate between the SE and non-SE devices and inform the mobile tokenization hub as to whether a request is associated with a SE device or non-SE device and the type of tokenization that should be implemented. In some embodiments, the type of token may be determined based on the types of previous tokens provisioned to the mobile device. As described herein, token types can include static, which may be stored on a secure element of a mobile device, and dynamic which may be stored in memory on the mobile device.

At step 506, a request is sent to the CTC module to generate a token of the determined type. For example, if it is determined that the request originated at a device with a secure element, a request for a static token may be sent to the CTC module, whereas if it is determined that the requesting device does not include a secure element, a request for a dynamic token may be sent. Alternatively, if the request originated from a device with a secure element with a pre-provisioned token, an activation request can be sent to the CTC module to associate the pre-provisioned token with a PAN and activate the pre-provisioned token.

At step 508, the requested token is received. The request token is of the requested type and may be generated according to one or more token generation rules based on the device, the payment application, the channel over which the request was received, etc.

At step 510, the requested token is returned to the requesting device. In some embodiments, a provisioning service may be used to open a secure connection to the device and store the token in the device's secure element. In other embodiments, the token may be encrypted and returned directly to the device or through the payment application.

In some embodiments of the present invention, a mobile tokenization hub may receive a token request associated with a first mobile device, wherein the first mobile device includes a secure element, and receive a token request associated with a second mobile device, wherein the second mobile device includes a non-secure element, and the mobile tokenization hub may be capable of differentiating the first mobile device and second mobile device, such that a first token generated for the first mobile device is different than a second token generated for the second mobile device.

In an SE mobile device, a "PAN substitute" can be received from a tokenization system (e.g., a mobile tokenization cloud or mobile tokenization hub) and a dynamic token can be constructed on the mobile device using the PAN substitute or other information. In an embodiment, an application on the mobile device that is in communication with the SE can generate the dynamic token in a tokenization system. The dynamic token may be generated using any available information including, in some embodiments, a combination of dynamic and static data available to the application.

In an embodiment, a static token can be embedded at the time of manufacturing a mobile device, and the static token may later be activated and authenticated by a consumer. Accordingly, the original equipment manufacturer (OEM) can incorporate the static token with the device or the static token may be provided by a mobile network operator (MNO) or other party at or before the time of ownership by the consumer. The consumer may then enter information to confirm the account holder's identity. A dynamic token may be provided after the mobile device is manufactured.

In an non-SE mobile device, a "PAN substitute" and dynamic element can be received from the mobile tokenization hub. For example, the CTC module may generate and/or transmit the data to the mobile device via a gateway. The dynamic element may be generated based on the PAN substitute or based on other device, transaction, and/or consumer information available to the mobile device.

As described further below with respect to FIGS. 6-15, the mobile tokenization hub can provide different processing depending on the token request received and device associated with the token request. For example, if a token request is received from a device that includes a pre-provisioned token stored in a secure element, the mobile tokenization hub can provide token activation processing. If the token request is received from a mobile device with a secure element, but without a pre-provisioned token, the mobile tokenization hub can provide tokenization and provisioning services. If the token request is received from a device without a secure element, the mobile tokenization hub may determine that a dynamic token is to be generated and provisioned and provide tokenization and provisioning services in response. As such, token requests can be differentiated by the mobile tokenization hub based on device information and different tokenization services may be provided, as appropriate.

Figure 6:
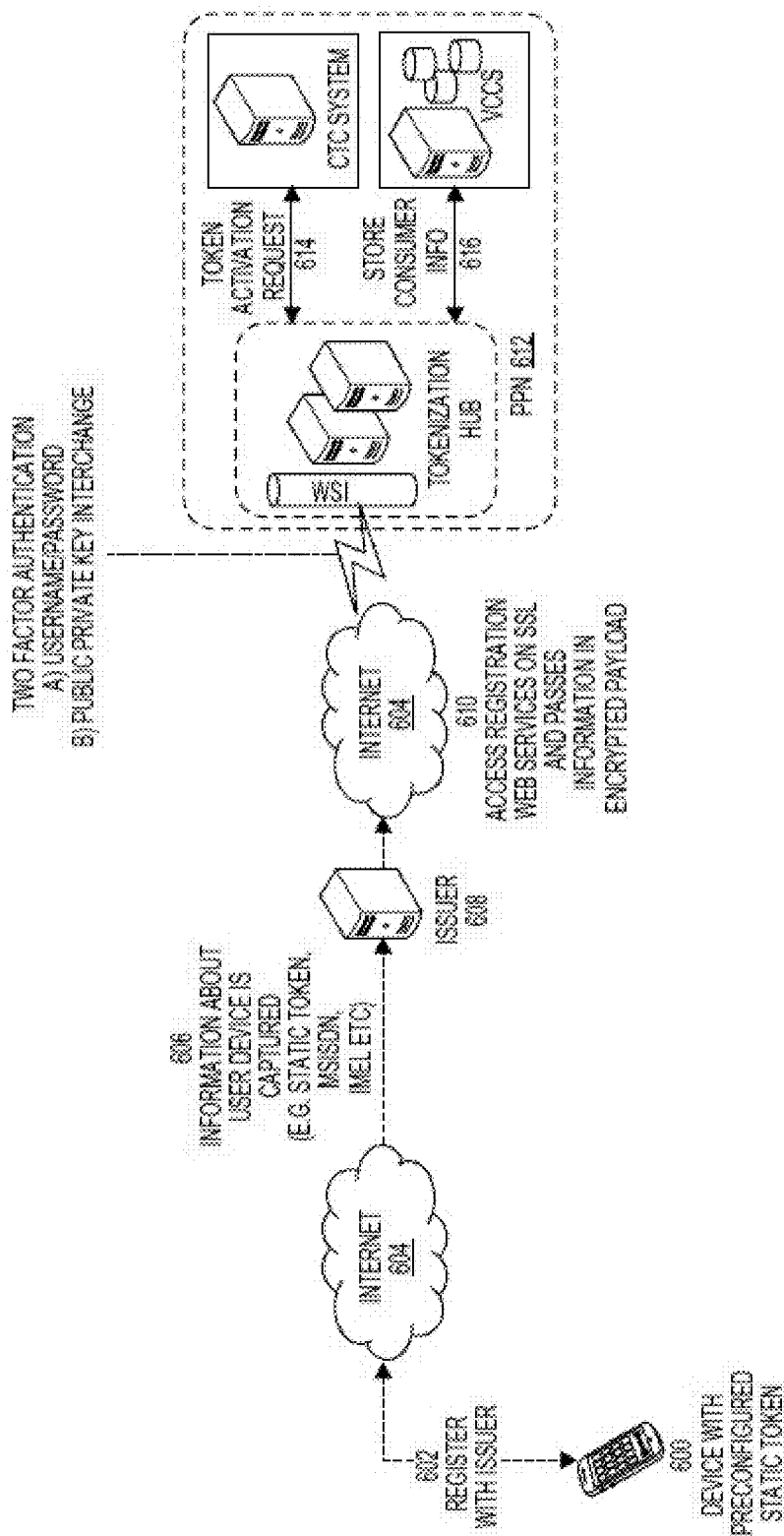
FIG. 6 shows a secure element (SE) and static token activation flow according to an embodiment of the present invention.

FIG. 6 shows a secure element (SE) and static token activation flow according to an embodiment of the present invention. The payment application may be associated with an issuer and/or provided by a payment processing network. In some embodiments, a mobile device that includes a secure element may initiate transactions using a static token stored on the secure element. The static token may be provisioned in the secure element at the time of manufacturing, or may be provisioned after the mobile device has been purchased by a consumer. After the tokens have been activated, transactions may be initiated using the mobile device through a near-field communication (NFC)/point of sale (POS) terminal, using an issuer payment application and/or a payment processing network (PPN) reference application. The transaction data type can include a chip transaction which may include Track 2 data, a dynamic card verification value (dCVV), an application cryptogram, issuer application data, and a running serial number (ATC).

In the example shown in FIG. 6, the mobile device 600 includes a static token provisioned in the secure element of the device that has been preconfigured. In some embodiments, the consumer may have downloaded the payment application from an application store associated with the mobile device and/or the consumer's mobile network operator. In some embodiments, the consumer can login to the application using credentials previously provider to the issuer and/or payment processing network and the application can authenticate the user based on the login credentials. In some embodiments, a wallet provider or issuer payment application may have registered with a mobile tokenization hub, they may receive a partner application identifier, they may have done bulk registration for existing consumers, and the consumers may have downloaded the wallet provider or issuer branded payment application in the device.

At 602, the consumer can register the mobile device through the application with the issuer 608 via the internet 604 by providing a consumer credential and/or information about their mobile device. At 606, information about the user device can be captured. This may include the static token or various device identifiers, including Mobile Station International Subscriber Directory Number (MSISDN) and International Mobile Station Equipment Identifier (IMEI).

At 610, the issuer can access registration web services at a mobile tokenization hub via a secure connection (e.g., SSL). The information may be passed in an encrypted payload. In some embodiments, two factor authentication may be used to provide additional security to the connection. For example, the two factors can include a username/password and a public/private key interchange. At 614, the mobile tokenization hub can communicate with the CTC module to activate the static token and associated the static token with a PAN.

In some embodiments, the device information captured at 606 can be provided to the mobile tokenization hub by the issuer 608. The device information can be mapped to the tokens associated with the device. This can be used to provide an additional verification check when a transaction is initiated using the token. If the transaction is initiated from a different device, the transaction can be rejected or additional information can be required from the consumer before completing the transaction. At step 5, the mobile tokenization hub can communicate with a credential database at a payment processing network. The captured consumer information and/or mapping information can be transmitted and stored in the credential database.

Figure 7:
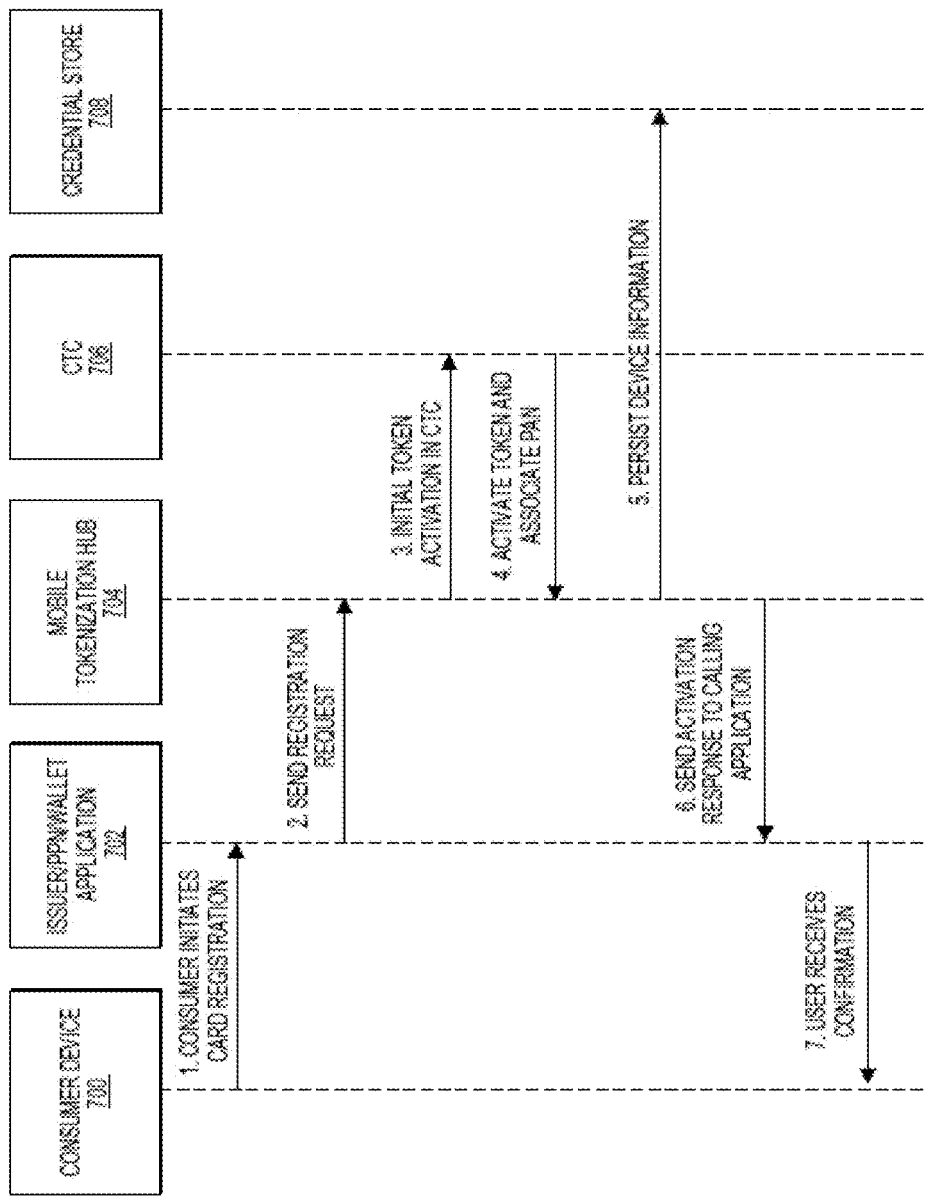
FIG. 7 shows a sequence diagram of token activation according to an embodiment of the present invention.

FIG. 7 shows a sequence diagram of token activation according to an embodiment of the present invention. At step 1, the consumer initiates account registration using their mobile device 700. The consumer initiates the account registration through a payment application 702 on the mobile device 700. In some embodiments, the payment application 702 can be an issuer application, a payment processing network application, or a mobile wallet application. The application can access and retrieve the static token from the secure element of the mobile device. The user can then be presented with one or more accounts associated with the application from which the consumer may select to register. In an embodiment, the user can enter the card information to register with wallet provider or issuer application. For each new card, the application can generate a new identifier, such as a PAN sequence number (PSN), to distinguish multiple PANs associated to the same token. During registration, the payment application 702 can capture mobile device details for mobile device 700. This may include the static token or various device identifiers, including Mobile Station International Subscriber Directory Number (MSISDN) and International Mobile Station Equipment Identifier (IMEI).

At step 2, the payment application 702 sends a registration request to the mobile tokenization hub 704. In some embodiments, the issuer application sends the registration request, including the token, PAN, PSN, and device information, to the mobile tokenization hub 704 through an API. At step 3, the mobile tokenization hub 704 determines based on the device information that the device includes a pre-provisioned token and initiates token activation in CTC 706. The mobile tokenization hub 704 can send a request to CTC 706 to activate the static token and associate the PAN with the token and the PSN.

At step 4, the CTC 706 activates the token and associates the token with the PAN and PSN. The CTC 706 can validate the static token and store the association of the PAN, token, and PSN. The CTC can store the PAN, issuer BIN, and product information within the CTC module for future processing.

At step 5, the mobile tokenization hub can persist the device information previously captured at step 1. The mobile tokenization hub can persist the device information in credential database in a payment processing network.

At step 6, after the device information has been stored and the token has been activated, a status response can be sent to the payment application 702. At step 7, a response message is returned to the user's mobile device, confirming that the device has been activated with an active token and is ready to perform transactions through the payment application 702. If activation was unsuccessful, an error can be returned.

Figure 8:
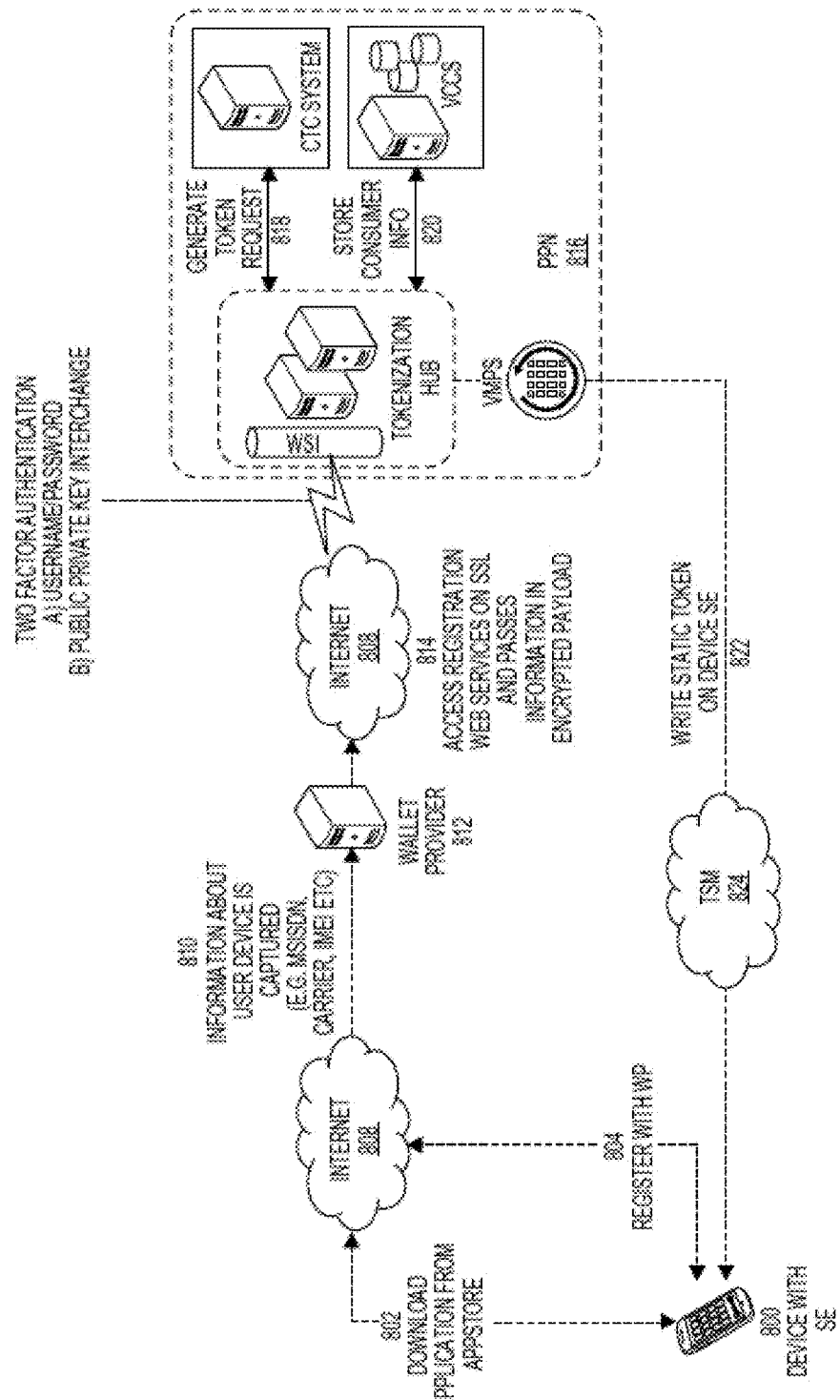
FIG. 8 shows a secure element (SE) and static token activation flow according to an embodiment of the present invention.

FIG. 8 shows a secure element (SE) and static token activation flow according to an embodiment of the present invention. In the example shown in FIG. 8, the mobile device 800 includes a secure element, but the secure element has not been pre-provisioned with a token. The token may be generated and provisioned to the device after device purchase. The consumer may download a payment application to the mobile device 800 to register the mobile device and receive a token. The payment application can authenticate the user based on the login credentials provided by the user.

At 802, the consumer can download the payment application from an online retailer over the Internet 808, such as an online application store associated with the mobile device or the consumer's mobile network operator. At 804, the consumer can initiate registration through the payment application. In the example shown in FIG. 8, the payment application is a mobile wallet application and the consumer initiates registration with an associated wallet provider. However, in alternative embodiments, the payment application may be associated with an issuer or a payment processing network.

At 810, information about the user device may be captured by the wallet provider 812. The information can include various device identifiers, like an MSISDN, carrier, or IMEI. At 814, the wallet provider can access registration web services via a secure connection (SSL) at a mobile tokenization hub on a payment processing network 816. Although the mobile tokenization hub is shown as integrated with the payment processing network, in some embodiments the mobile tokenization hub may be implemented separately. The information may be passed in an encrypted payload. In some embodiments, two factor authentication may be used to provide additional security to the connection. For example, the two factors can include a username/password and a public/private key interchange. At 818, the mobile tokenization hub can send a token generation request to the CTC module. At 820, the mobile tokenization hub can store consumer information provided in 804 and device information captured in 810 in a credential database. Consumer and device information can be mapped to the newly generated token and used as an additional verification check when a transaction is initiated. If consumer or device information provided during a transaction using the token does not match that stored during registration, the transaction may be rejected or additional information may be required from the consumer. Once the token has been generated and the consumer and device information stored, the token can be sent from the CTC module to the mobile tokenization hub. At 822, the tokenization hub can open a secure connection to the mobile device 800 through a mobile provisioning service, such as TSM 824, and the newly generated static token can be written to the device SE.

Figure 9:
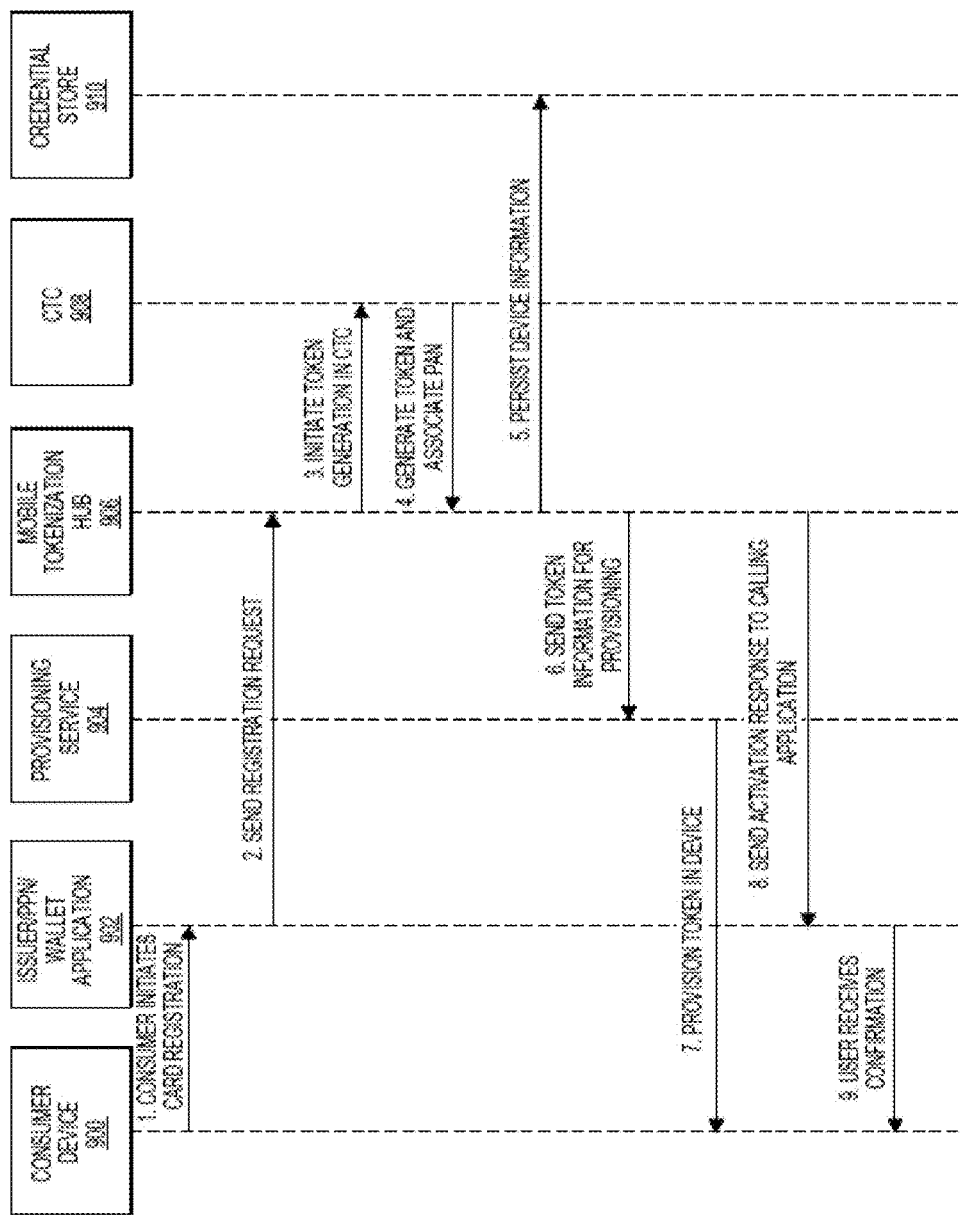
FIG. 9 shows sequence diagram of token generation according to an embodiment of the present invention.

FIG. 9 shows sequence diagram of token generation according to an embodiment of the present invention. At step 1, the consumer initiates account registration on mobile device 900 through a payment application 902. In some embodiments, the payment application can be a mobile wallet application, an issuer-branded application, or a payment processing network reference application. In some embodiments, multiple accounts can be registered on the same device, and the user can select the account from the payment application to register.

At step 2, the payment application can send a registration request to the mobile tokenization hub 906. The payment application can send PAN and device information to the mobile tokenization hub through an API. At step 3, the mobile tokenization hub 906 can determine based on the device information that the mobile device includes a secure element and initiate token generation in CTC module 908. The mobile tokenization hub can send a request to the CTC module to generate static a token to be stored in the mobile device's secure element and register the PAN for the token. Multiple tokens can be generated for one device, one for each account registered with that device. In some embodiments, multiple accounts registered with a device can be associated with the same token and a PSN can be used to distinguish between accounts.

At step 4, the CTC module 908 can generate a new token and map the token to the PAN and device information. In some embodiments, the CTC module 908 can store the PAN, issuer BIN, and/or product information within CTC module for future processing. At step 5, the mobile tokenization hub 906 can persist the device information in a credential database in the payment processing network. The device information can be mapped to the tokens and/or accounts registered for the device and used as an additional verification mechanism, as described above.

At step 6, the mobile tokenization hub can initiate a request to a provisioning service 904 to provision the token information in the device. At step 7, provisioning service can open a secure connection to mobile device 900 and provision the token in the mobile device's secure element. At step 8, after the token has been provisioned in the device, a success/status response may be sent to the payment application 902 from the mobile tokenization hub 906. At step 9, a confirmation message can be sent to the mobile device indicating to the consumer that the mobile device has been activated with an active token ready for transactions. The mobile device is then ready to make transactions using the static token through the payment application.

Figure 10:
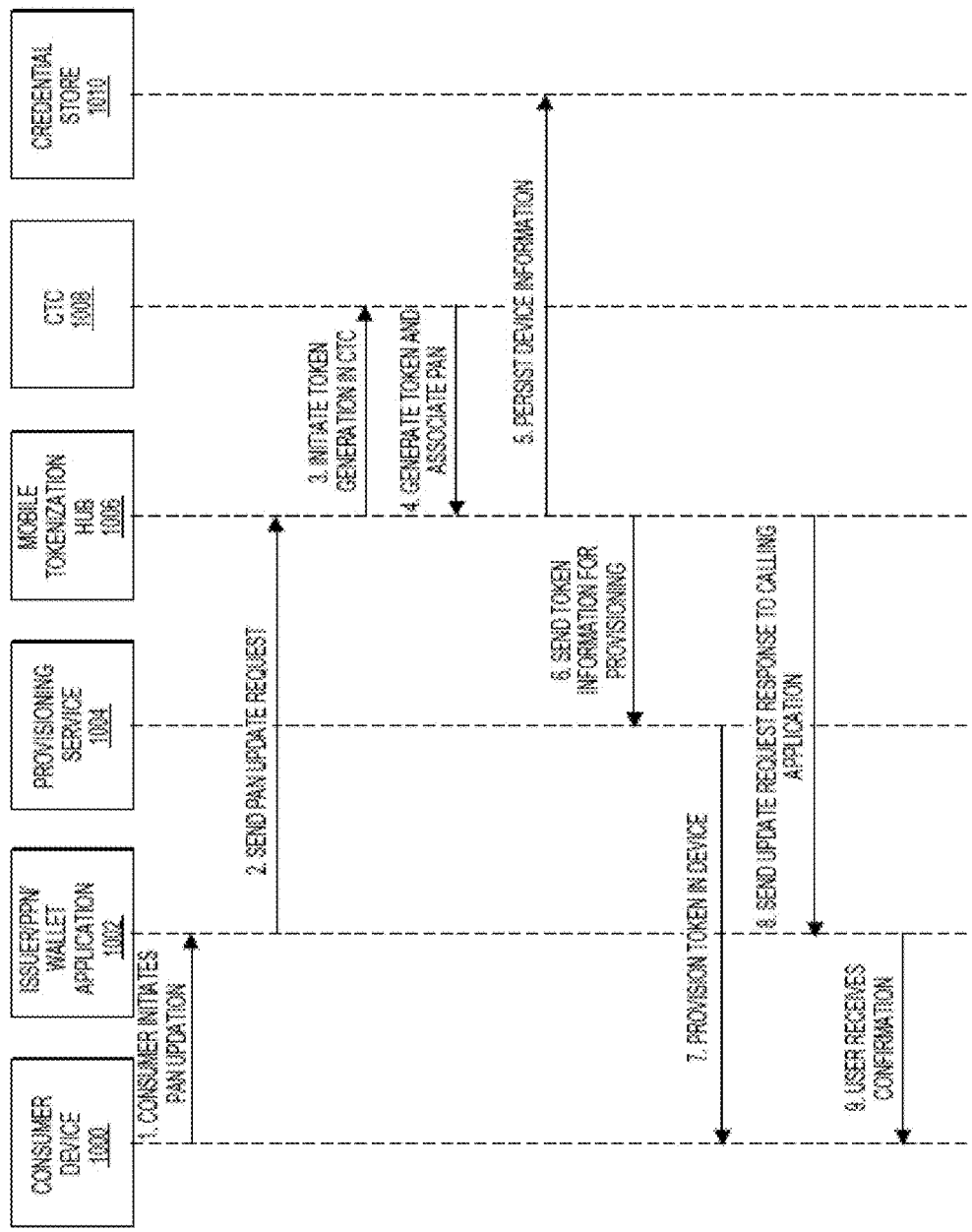
FIG. 10 shows a sequence diagram of token updating according to an embodiment of the present invention.

FIG. 10 shows a sequence diagram of token updating according to an embodiment of the present invention. The mobile device 1000 may have secure element to which token information has been provisioned. If the token has been compromised, or the consumer adds an account, or otherwise initiates a token update process, a new token may be provisioned to the consumer's mobile device 1000. At step 1, the consumer can initiate an update through the payment application 1002. The payment application may be a mobile wallet application, issuer-branded application, or payment processing network application. At step 2, payment application 1002 sends an update request including one or more new PANs and device information to the mobile tokenization hub 1006 through an API.

At step 3, for each PAN update request, the mobile tokenization hub 1006 can request a new static token from CTC module 1008. In an embodiment, the mobile tokenization hub can treat the update request as a new static token generation request. The mobile tokenization hub can send a request for each new PAN to the CTC module to generate a token and associate the new PAN with the new token. At step 4, the CTC module 1008 can generate a new token and store the association with the new PAN. At step 5, the mobile tokenization hub can persist the device information in a credential database.

At step 6, the mobile tokenization hub 1006 can initiate a request to a provisioning service 1004 to provision each new token information to the device. At step 7, the provisioning service can provision each new token in the mobile device's secure element. At step 8, after the tokens have been provisioned in the device, the mobile tokenization hub can send success or status response to the payment application. In some embodiments, where multiple tokens are being provisioned to the same device, the mobile tokenization hub can send status updates after each token has been provisioned, or can send a single update after all tokens have been provisioned reflecting the status of each token. At step 9, a confirmation can message can be sent to the mobile device 1000 indicating that the mobile device has been loaded with one or more new static tokens ready for transactions through the payment application.

Figure 11:
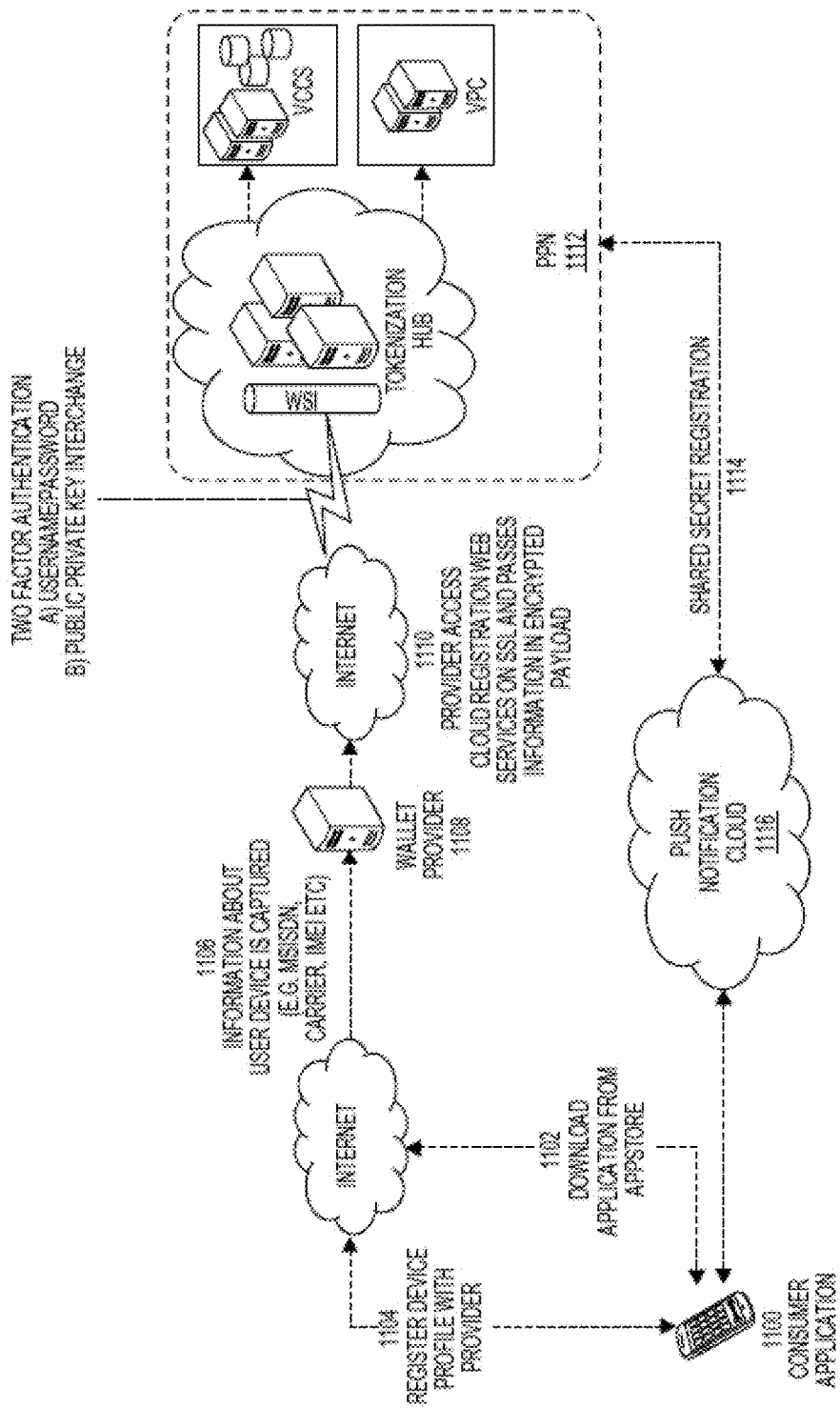
FIG. 11 shows a non-secure element (non-SE) and dynamic token user/account registration flow according to an embodiment of the present invention.

FIG. 11 shows a non-secure element (non-SE) and dynamic token user/account registration flow according to an embodiment of the present invention. Because the mobile device 1100 does not include a secure element, a dynamic token with a limited lifecycle may be provided to the device to complete a transaction. The mobile device may include a payment application, such as a wallet application, issuer payment application, or PPN application. The payment application can authenticate the user based on login credentials provided by the user.

As shown in FIG. 11, at 1102, the consumer can download the payment application from an online application store. At 1104, the consumer can register the mobile device with the application provider, such as a wallet provider 1108, payment processing network, or issuer. At 1106, information about the mobile device can be captured, this information may include device identifiers (e.g., MSISDN, carrier, IMEI). At 1110, the wallet provider can communicate with the mobile tokenization hub. The mobile tokenization hub may be located as a cloud format for cloud registration. The wallet provider can access registration web services via a secure connection (SSL). The information may be passed in an encrypted payload. The mobile tokenization hub can store the mobile device and consumer information in a credential store. At 1114, after mobile device and consumer information has been stored, shared secret registration can be transmitted between the mobile tokenization hub and a push notification cloud 816. The shared secret registration information can include a code provided by the mobile tokenization hub or may include a question provided by the mobile tokenization hub and an answer provided by the consumer.

In some embodiments, the shared secret setup interface can be provided through an API enables payment application providers (issuers, wallet providers, payment processing networks, etc.) to setup shared secret (e.g., set of N questions) as an additional security measure when dynamic tokens are requested during transactions. For example, each token request can challenge the user with a configured shared secret and validate the response. The request may originate from non-SE device issuer payment application or wallet application.

Figure 12:
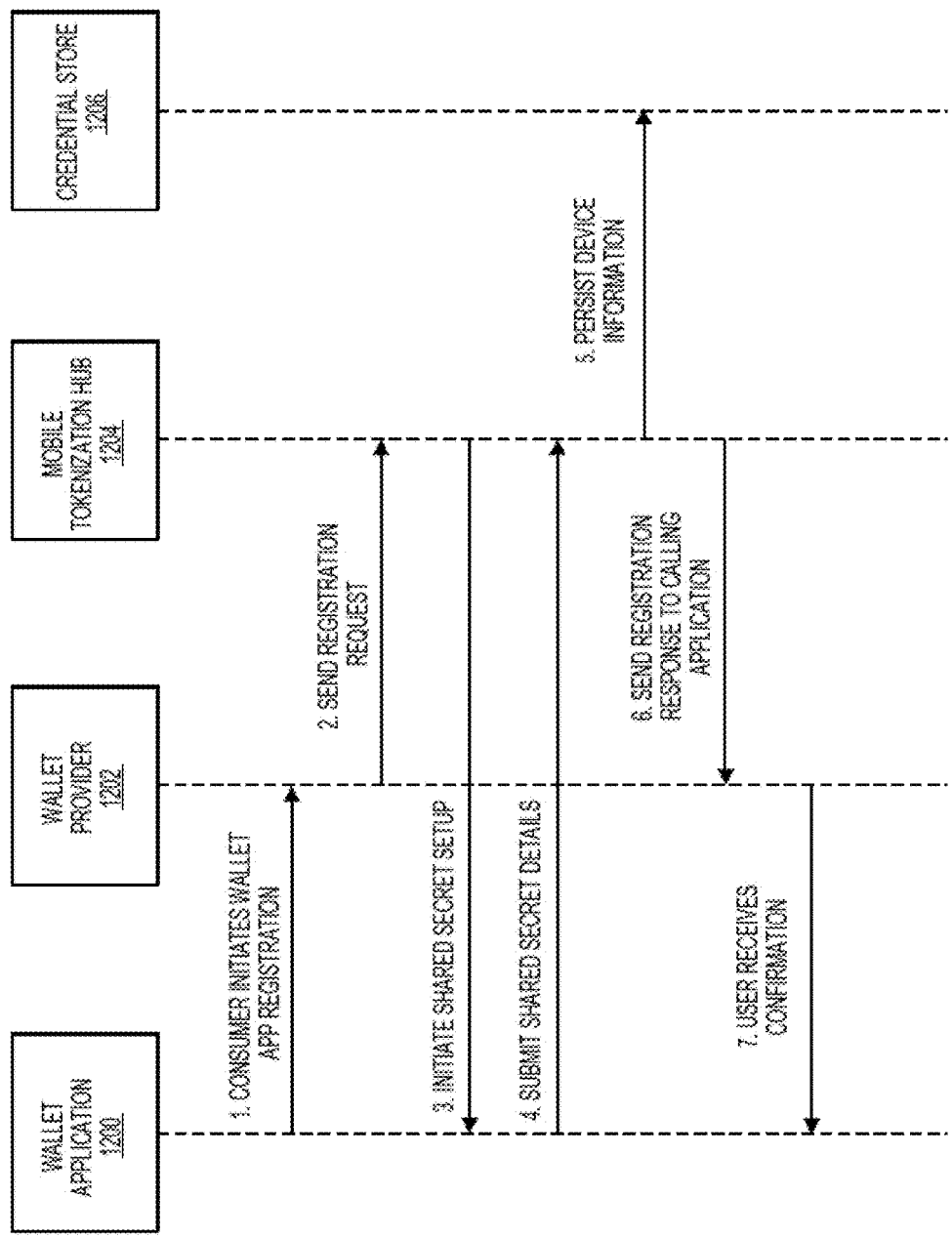
FIG. 12 shows sequence diagram of user/account registration flow according to an embodiment of the present invention.

FIG. 12 shows sequence diagram of user/account registration flow according to an embodiment of the present invention. At step 1, a consumer initiates account registration through a payment application, such as wallet application 1200. The payment application may alternatively include an issuer payment application or a PPN reference application. The application can authenticate the user based on login credentials provided by the user. The user can select the account from the application to register.

At step 2, application provider 1202 can send a PAN and device information to the mobile tokenization hub 1204 through an API. At step 3, the mobile tokenization hub 1204 can determine based on the device information whether the mobile device is associated with an account. If the mobile device is not already registered, the mobile tokenization hub can push a notification to the payment application to setup a shared secret. For example, the setup can include a set of 3 questions sent to the consumer through the wallet application 1200. At step 4, the consumer may input shared secret answers, e.g., to the set of questions provided in step 3. The payment application can encrypt the answers and send the response to the mobile tokenization hub through an API.

At step 5, the mobile tokenization hub 1204 can persist the device or platform information to a credential store 1206. At step 6, once the credentials have been updated, an activation response can be sent to the application provider confirming registration. At step 7, the application provider can send confirmation to the user through the payment application. Once confirmed, the device is activated and ready for transactions using dynamic tokens through the payment application.

Figure 13:
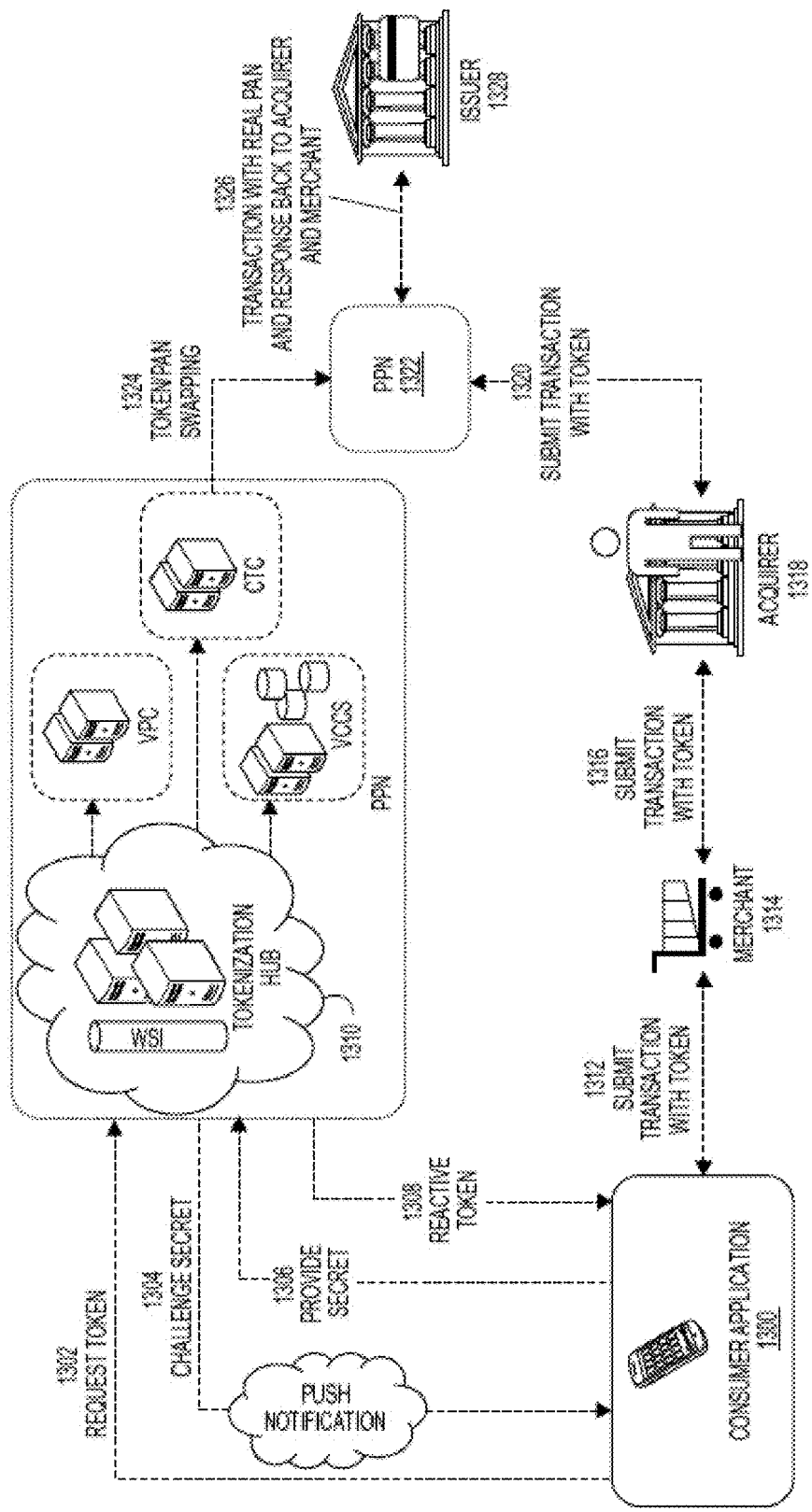
FIG. 13 shows a non-secure element (non-SE) and dynamic token generation flow according to an embodiment of the present invention.

FIG. 13 shows a non-secure element (non-SE) and dynamic token generation and transaction flow according to an embodiment of the present invention. As described above with respect to FIG. 12, a consumer with a mobile device that does not include a secure element can download and install a payment application 1300, such as a wallet application, issuer payment application, or payment processing network application. The application can authenticate the user based on login credentials provided the user. The device may be already registered in the mobile tokenization hub with a valid account. Because the mobile device does not include a secure element, it is not associated with a static token. Instead, the mobile device needs to request a dynamic token to complete a transaction.

In some embodiments, a mobile device that does not include a secure element (non-SE) may be used with a dynamic token. The mobile device may be a personal computer (PC) that includes a payment application. The payment application can include an issuer payment application, a wallet provider application, and/or a PPN reference application that enables the consumer to perform card not present (e.g., an online) transactions. When a transaction is initiated, the transaction data may include a PAN, expiration date, and/or card verification value (CVV).

In some embodiments, a non-SE mobile device may be used with a dynamic token. The mobile device may include a payment application, such as an issuer payment application, a wallet provider application, and/or a PPN reference application. The non-SE mobile device may perform chip transactions using the dynamic token. Transaction data for the chip transaction may include Track 2 data, a dCVV, an application cryptogram, payment application data, and an ATC. In some embodiments, the payment application at the mobile device may generate a QR code (e.g., Quick Response Code, bar code) that includes the dynamic token. The transaction data type can include a chip transaction which may include Track 2 data, a dCVV, an application cryptogram, issuer application data, and an ATC.

At 1302, the consumer requests a token from the mobile tokenization hub 1310. Using the shared secret information created during registration, at 1304 the mobile tokenization hub sends a challenge request to the consumer application through a push notification cloud. At 1306, the consumer enters the secret response created during account registration to the tokenization hub. At 1308, if the secret response returned at 1306 is correct, the tokenization hub sends a dynamic token to the consumer application.

At 1312, the consumer can initiate a transaction with a merchant 1314 using the token. For example, the token may be packaged into a QR code and displayed on the mobile device. The consumer may then scan the displayed code on a merchant point of sale terminal. Alternatively, the token may be transmitted from the user device to the merchant POS using NFC or other radio frequency communication. The transaction may also be performed online from the payment application, without requiring any interaction with a merchant POS. At 1316, the merchant 1314 can submit the transaction with the dynamic token to the merchant's acquirer 1318. Because the dynamic token is formatted to match the expected account identifier, no modifications are required to the merchant or acquirer systems to use the token. At 1320, the acquirer 1318 submits the transaction with the token to a payment processing network (PPN) 1322.

At 1324, the PPN recognizes the dynamic token as a PAN substitute. For example, a portion of the token may include a code that indicates the token is a token. The PPN sends a request to the CTC module for the PAN associated with the token. The request may include transaction data (such as consumer and device information) received from the mobile device via the merchant and acquirer. The CTC module may verify the transaction request by comparing the device information against device information associated with the token. If the CTC verifies the transaction, it can look up the PAN associated with the token, and return the PAN to the PPN. At 1326, the PPN can process the transaction using the PAN retrieved from the CTC with issuer 1328. The PPN can provide a response back to acquirer and merchant indicating if the transaction has been approved.

Figure 14:
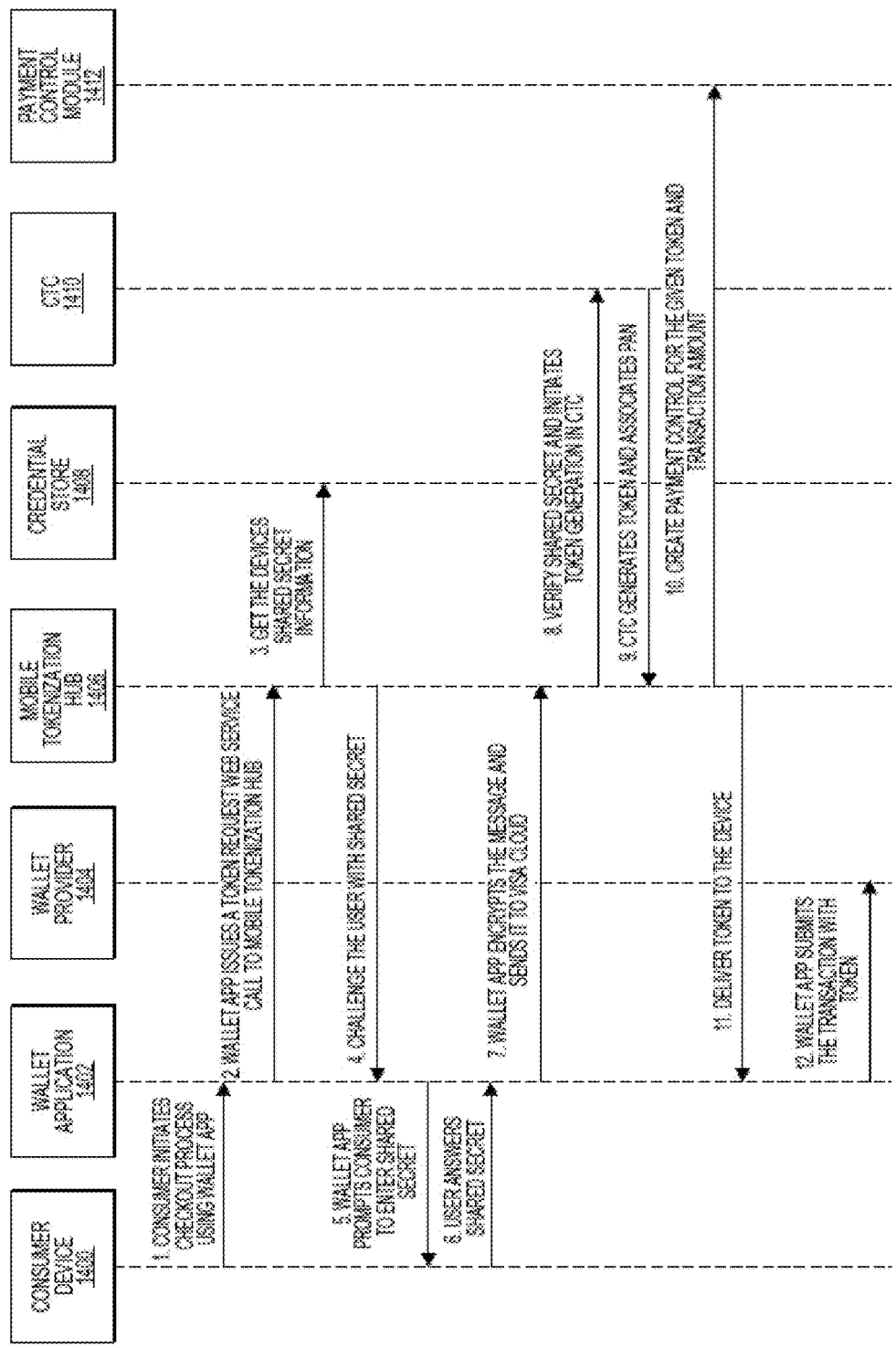
FIG. 14 shows a non-secure element (non-SE) and dynamic token generation flow according to an embodiment of the present invention.

FIG. 14 shows a non-secure element (non-SE) and dynamic token generation flow according to an embodiment of the present invention. At step 1, consumer initiates a transaction, for example by selecting an account alias in a wallet application, issuer payment application, payment processing application, or other digital wallet on the consumer's mobile device 1400. At step 2, the payment application 1402 sends a request for a dynamic token to mobile tokenization hub 1406 through a mobile tokenization hub API. The payment application can include a PAN alias, device information and purchase amount in the new token request.

At step 3, the mobile tokenization hub 1406 can retrieve shared secret details of the device from a credential store 1408. The shared secret details can be provided by the consumer during device registration, as described above. At step 4, the mobile tokenization hub can select at least one of the shared secret question and send it to the payment application. At step 5, The payment application can display the secret question to the user on the mobile device 1400. At step 6, the payment application receives the consumer's response to the secret question and, at step 7, encrypts the response and sends the response to the mobile tokenization hub 1406.

At step 8, the mobile tokenization hub 1406 can verify the response to the shared secret provided by the consumer. If the response is correct, the mobile tokenization hub can determine, based on the device information, a type of token to generate for the device and can then send a request to CTC module 1410 to generate a new token of that type and register the PAN for the token. In this example, the mobile tokenization hub can determine that the device does not include a secure element and can send a request to the CTC to generate a dynamic token for the device. At step 9, the CTC module can generate a new token and store the association of the new token with the PAN. The CTC can store real PAN, issuer BIN, or product information within CTC for future processing.

At step 10, mobile tokenization hub 1406 can send a request to a payment control module 1410 to create a payment control for the token. The payment control may be based on the amount of the transaction. At step 11, the mobile tokenization hub can send the dynamic token to the payment application 1402. At step 12, the payment application 1402 can submit the transaction with the dynamic token received from the mobile tokenization hub 1406 to the application provider 1404. The transaction may then be processed as described above with respect to FIG. 13.

Figure 15:
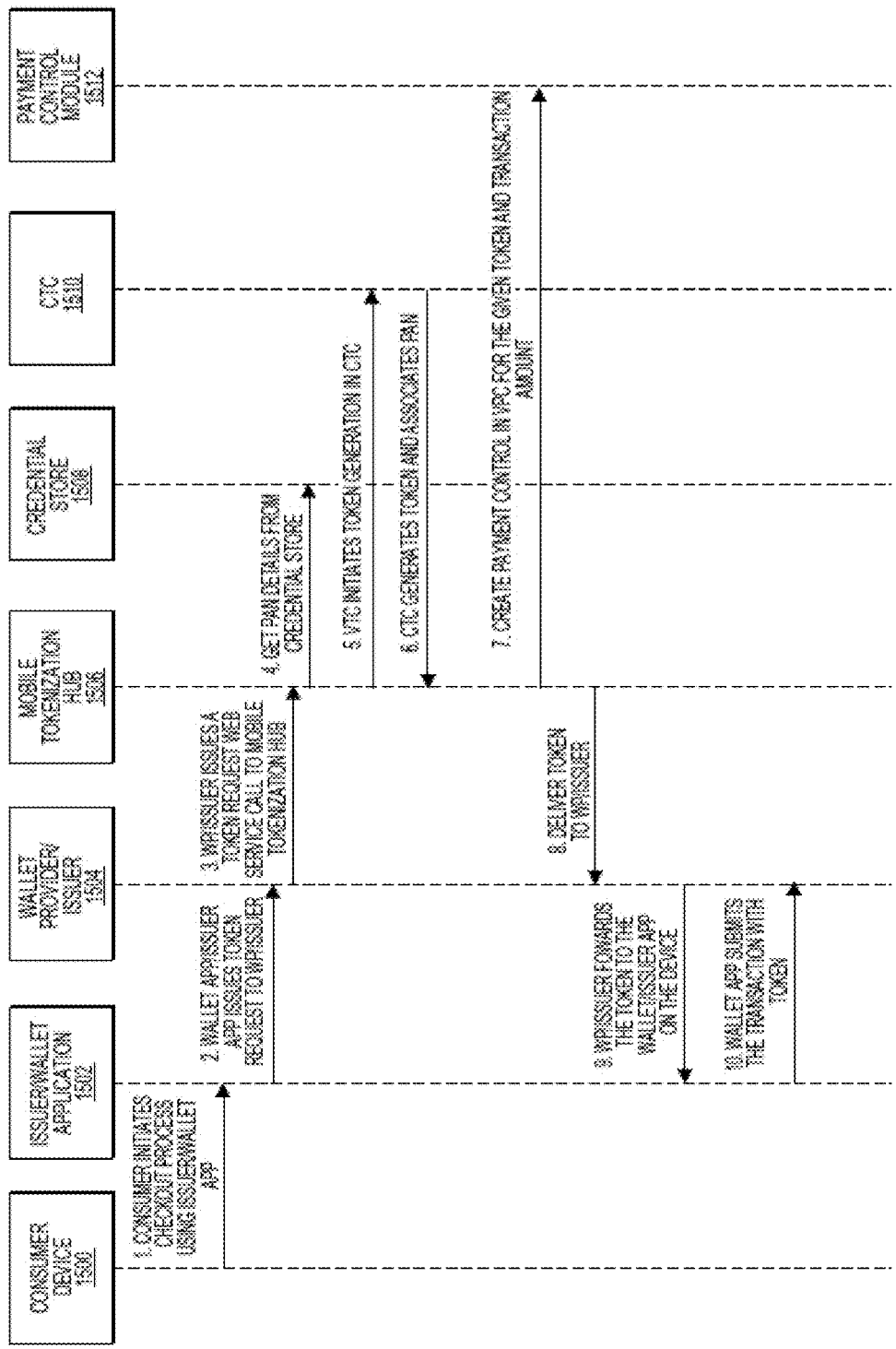
FIG. 15 shows a non-secure element (non-SE) and dynamic token generation flow according to an embodiment of the present invention.

FIG. 15 shows an alternative non-secure element (non-SE) and dynamic token generation flow according to an embodiment of the present invention. In the embodiment shown in FIG. 15, a dynamic token may be generated and sent to the consumer's mobile device 1500 without first confirming the consumer's identity using a previously supplied secret answer. Similar to FIG. 14, at step 1, a consumer initiates a payment process by selecting an alias account corresponding to a payment account in a payment application 1502, such as a wallet application, issuer payment application, or other digital wallet. At step 2, the payment application can send a token request to an application provider 1504, such as a wallet provider or issuer system. The token request may include a PAN alias, device information and purchase amount. At step 3, the application provider 1504 sends the token request and device information to a mobile tokenization hub 1506 through a mobile tokenization hub token request API. At step 4, the mobile tokenization hub 1506 can determine, based on the device information, a type of token to generate for the device and can retrieve PAN details from a credential store 1508. For example, the credential store may include a data structure that maps account aliases to account identifiers.

At step 5, the mobile tokenization hub can send a request to the CTC module 1510 to generate a new token having the type determined in step 4 and register the PAN for the token. In some embodiments, before sending the request to the CTC module, the mobile tokenization hub can compare device information provided with the token request to device information provided when the consumer first registered an account. If the device information matches, the token request is sent to the CTC module 1510. If the device information does not match, additional authentication methods may be performed to confirm the consumer's identity. At step 6, the CTC module 1510 can generate new token and store the association with the PAN. At step 7, the mobile tokenization hub can send a request to a payment control module to create a payment control for the given PAN, e.g., based on the purchase amount included in the transaction data.

At step 8, the mobile tokenization hub can deliver the generated dynamic token to the payment application provider. At step 9, payment application provider can send the token to the payment application. At step 10, the payment application can submit the transaction with the dynamic token received from mobile tokenization hub. The transaction may then be processed as described above with respect to FIG. 13.

V. Bulk Requests

In some embodiments, token requests may be received in a bulk format. For example, a device manufacturer may send a bulk token request for tokens to pre-provision to many different mobile devices prior to delivery to consumers. In some embodiments, wallet providers, issuers, and/or a PPN reference application can send bulk token registration requests to the mobile tokenization hub to register all the existing customers' device/card information in the mobile tokenization hub. The bulk token request may include a bulk registration file.

In response to receiving a bulk token request, the mobile tokenization hub can call a credential store service for each consumer record present in the registration file to validate card information and persist device information and other consumer information in the credential store. The mobile tokenization hub can then send a request to the CTC module to perform bulk token activation/generation. For each device with SE and pre-provisioned token present in the bulk registration file, mobile tokenization hub initiates token activation in CTC. For each device with SE (no static token in the device), the mobile tokenization hub can initiate token generation in CTC. The CTC can the activate/generate tokens and associate PANs, where known, with the tokens. The mobile tokenization hub can then send a bulk provisioning file to a provisioning service (such as a mobile gateway or TSM) with the generated tokens and corresponding mobile device information. The provisioning service can then securely connect to each mobile device and provision the tokens to the mobile devices' secure elements. Upon successful provisioning, a confirmation message is received from each mobile device, and the provisioning service provides a response file to the mobile tokenization hub that indicates the status of each provisioning operation. The mobile tokenization hub can deliver registration response file to wallet provider, issuer, or reference application with details. The details may include one or more of a total number of registrations present in the request file; a number of successful registrations; a number of unsuccessful registrations; details for unsuccessful registrations; and device registrations pending for provisioning and estimated provisioning time

VI. Dynamic Identification Information Generation

Figure 16:
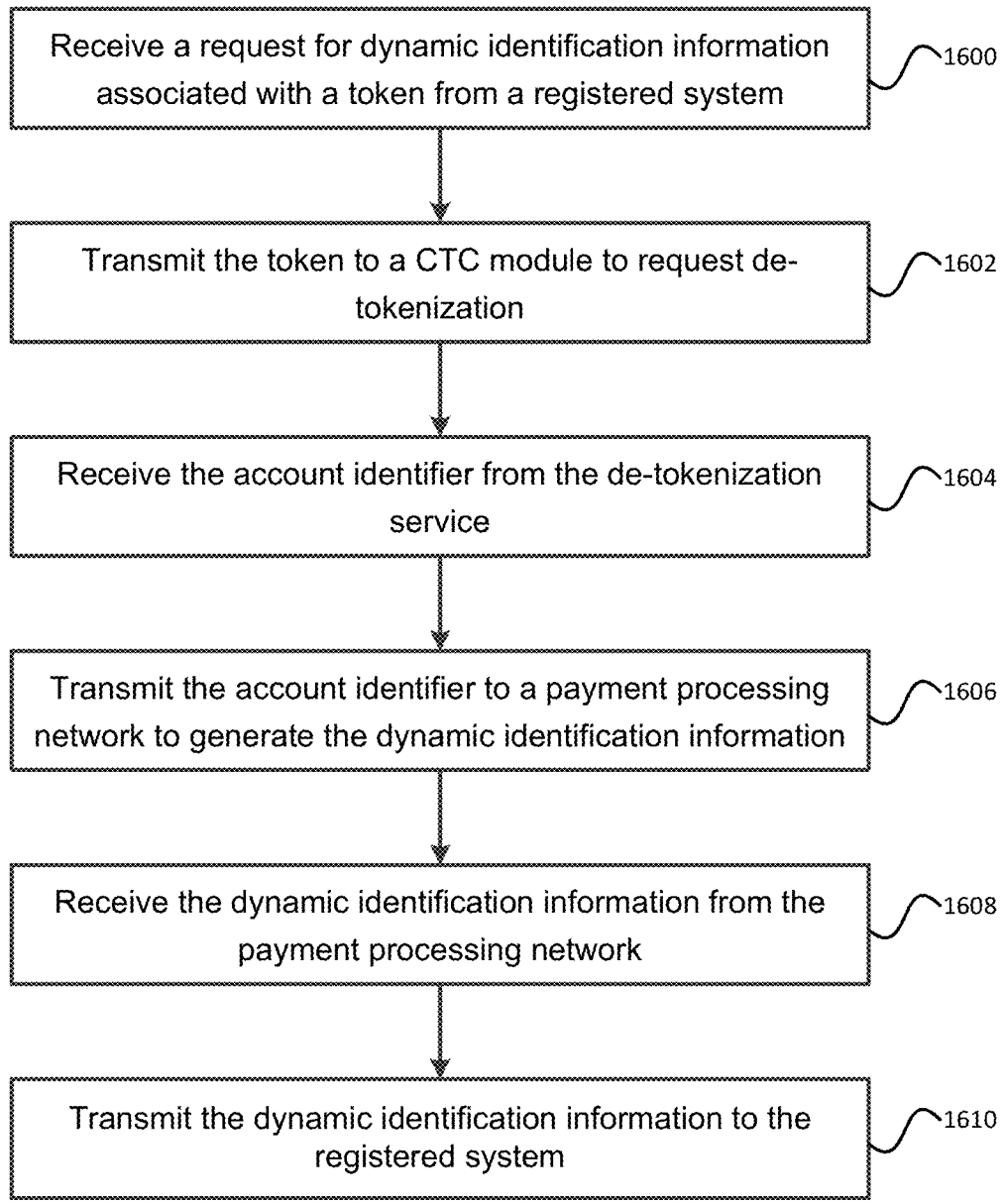
FIG. 16 shows a method of generating dynamic identification information for tokens according to an embodiment of the present invention.

FIG. 16 shows a method of generating dynamic identification information for tokens according to an embodiment of the present invention. Embodiments of the invention may provide for generation of dynamic identification information, such as a dCVV value or other dynamic verification value provided by a transaction processor, for a token received from a registered system.

At step 1600, the mobile tokenization hub can receive a request for dynamic identification information associated with a token from a registered system. In some embodiments, the mobile tokenization hub may provide services for verifying a dCVV associated with a token received from a registered service or entity, or may generate a new dCVV and provide the new dCVV to the requesting service or entity to be used to validate transaction data.

For example, some issuers, wallet providers, acquirers, or other entities in a transaction may validate transactions by using a dCVV comparison during a transaction to ensure a transaction is legitimate. However, when substitute tokens with account identifiers that were not present at the initiation of a transaction, a new dCVV may be required in order for a transaction to be able to be verified by currently existing transaction systems. Accordingly, the mobile tokenization hub may determine a replacement dCVV to substitute in an authorization request message, transaction request, or other transaction information in order for an issuer, wallet provider, or other entity to authorize, authenticate, or continue with the transaction. Accordingly, in some embodiments, the mobile tokenization hub may request a new dCVV value be generated by the CTC during a transaction.

In some embodiments, a dCVV value can be requested for a token at the time the transaction is initiated. The mobile tokenization hub can publish an application programming interface (API) to allow a registered system (e.g., wallet provider, issuer, mobile device, or other entity which has previously registered for service with the mobile tokenization hub) to request a dCVV value for a token from the mobile tokenization hub in order to validate the transaction as legitimate.

In one embodiment, the mobile tokenization hub can translate the received token into a real account identifier (e.g., PAN) by communicating with a CTC de-tokenization API. As shown in step 1602, the mobile tokenization hub can transmit the token to a common tokenization capability module that includes a de-tokenization module that converts the token into an account identifier. The CTC module to de-tokenize a token into an account identifier associated with a consumer account (e.g., a PAN).

At step 1604, the mobile payment hub receives the account identifier from the de-tokenization service. As described above, the account identifier may be a PAN. In some embodiments, the mobile tokenization hub may authenticate the requestor prior to either requesting de-tokenization or performing any operations on the de-tokenized account identifier (e.g., the mobile tokenization hub may request additional information from the requesting entity). In some embodiments, the mobile tokenization hub may communicate with the payment processing network through a dCVV API to request a dCVV value for the real account identifier (e.g., PAN) that is determined or translated through the de-tokenization process.

At step 1606, the mobile tokenization hub transmits the account identifier to a payment processing network to generate the dynamic identification information. In some embodiments, the mobile tokenization hub may be integrated with the payment processing network. In such embodiments, the mobile tokenization hub may include a dCVV generation module to generate the dCVV value. At step 1608, the mobile tokenization service may receive the dynamic identification information from the payment processing network.

At step 1610, the mobile tokenization hub can transmit the dynamic identification information to the registered system. For example, the mobile tokenization hub may provide a dCVV value associated with the account identifier to the requesting application or transaction entity so that the transaction can be validated or verified using based on the dCVV value for the substituted account identifier.

In some embodiments, a mobile tokenization hub may interact with a CTC module on behalf of the other services, servers, or transaction entities. However, in other embodiments, the other services, entities involved in the transaction, or servers may communicate directly with the CTC module. For example, in some embodiments, registered systems may be provided with an interface to the CTC, which may provide a more limited number of services to the registered systems than the mobile tokenization hub.

In some embodiments, the dCVV can be generated and sent with transaction data to an issuer for authorization. The issuer can generate a dCVV for the de-tokenized PAN and compare it to the dCVV generated by the mobile tokenization hub to validate the token. In some embodiments, an acquirer system, payment processing network, or wallet provider may similarly validate a token by generating a dCVV for the de-tokenized PAN and comparing it to the value received from the mobile tokenization hub. If the dCVV generated by the mobile tokenization hub matches the dCVV generated by the issuer, acquirer, payment processing network, or wallet provider, then the transaction is validated.

VII. Token Presence and Verification

Figure 17:
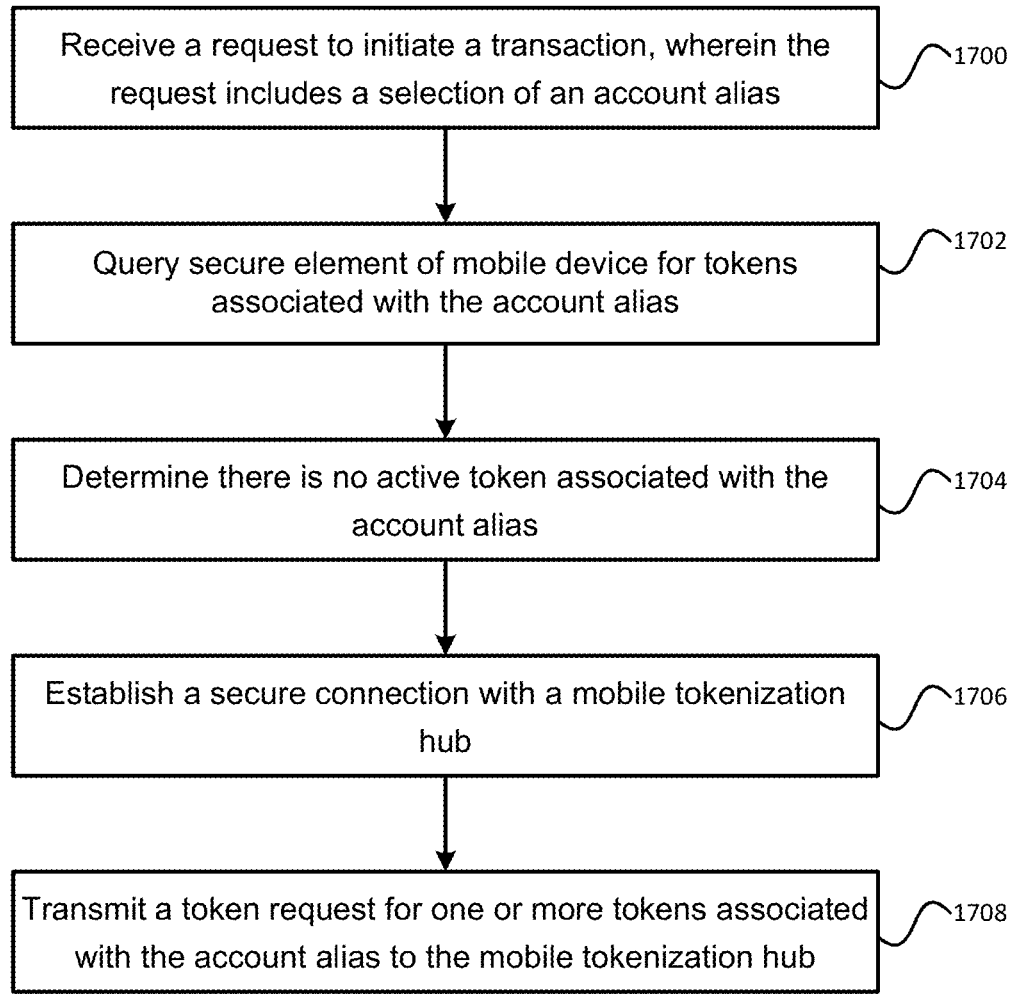
FIG. 17 shows a method of determining token presence on a mobile device according to an embodiment of the present invention.

FIG. 17 shows a method of determining token presence on a mobile device according to an embodiment of the present invention. At step 1700, the mobile tokenization hub can receive a request a request to initiate a transaction through an application on a mobile device. The application can include a wallet provider, issuer, and/or payment processing network reference application. The request can be initiated by the user by selecting an "alias" for the account. For example, the user may designate a debit card account with an alias of "checking account" or other easy to remember designation.

At step 1702, the mobile device can be queried for active tokens for the account associated with the alias. For example, in response to the request, the mobile tokenization hub may open a secure connection to a secure element on the mobile device and determine whether there are any tokens associated with the account. If there are tokens, the mobile tokenization hub can determine whether the tokens are still active. For example, the mobile tokenization hub can determine if the tokens have expired, have reached a preset spending limit, or whether the tokens are eligible for the current transaction (e.g., whether the amount of the transaction is within a preset range of values for the token). Additionally, or alternatively, the application the application may query the device's secure element and/or application memory to determine if there are any tokens associated with the account. If one or more tokens are identified, then the application can determine whether the tokens are active and/or available for the current transaction.

At step 1704 it is determined that no active token is associated with the account alias. For example, all tokens found may be expired or not eligible for the transaction (e.g., because the tokens' spending limits have been reached or the amount is not within the tokens' pre-set spending range of values).

At step 1706, a secure connection with a mobile tokenization hub server computer is established initiate a new token request for the selected account alias. At step 1708, a token request is transmitted for one or more new tokens associated with the account to the mobile tokenization hub server computer.

The system can verify token presence. When a consumer initiates a transaction by selecting an account nickname (alias) in the wallet provider, issuer, PPN reference application, the application can check for the token in the device's secure element and then in application memory. If no valid token found for the selected account, a secure connection can be established with the mobile tokenization hub. A new token request can be initiated for the selected account nickname (alias).

A token validity update interface can be provided. The system may provide an API to the requesting applications (internal/external) to update token validity timeframe (extend or reduce) by providing token details. The information can include a partner platform identifier, application identifier, token or new validity timeframe.

VIII. Exemplary Systems

Provided below is a description of an exemplary system in which embodiments provided herein may be utilized. Although some of the entities and components may be depicted as separate, in some instances, one or more of the components may be combined into a single device or location (and vice versa). Similarly, although certain functionality may be described as being performed by a single entity or component within the system, the functionality may in some instances be performed by multiple components and/or entities (and vice versa). Communication between entities and components may comprise the exchange of data or information using electronic messages and any suitable electronic communication medium and method, as described below.

As used herein, an "issuer" may typically refer to a business entity (e.g., a bank or other financial institution) that maintains financial accounts for the user 30 and often issues a payment device 32 such as a credit or debit card to the user 30. As used herein, a "merchant" may typically refer to an entity that engages in transactions and can sell goods or services to the user 30. As used herein, an "acquirer" may typically refer to a business entity (e.g., a commercial bank or financial institution) that has a business relationship with a particular merchant or similar entity. Some entities can perform both issuer and acquirer functions.

Figure 18:
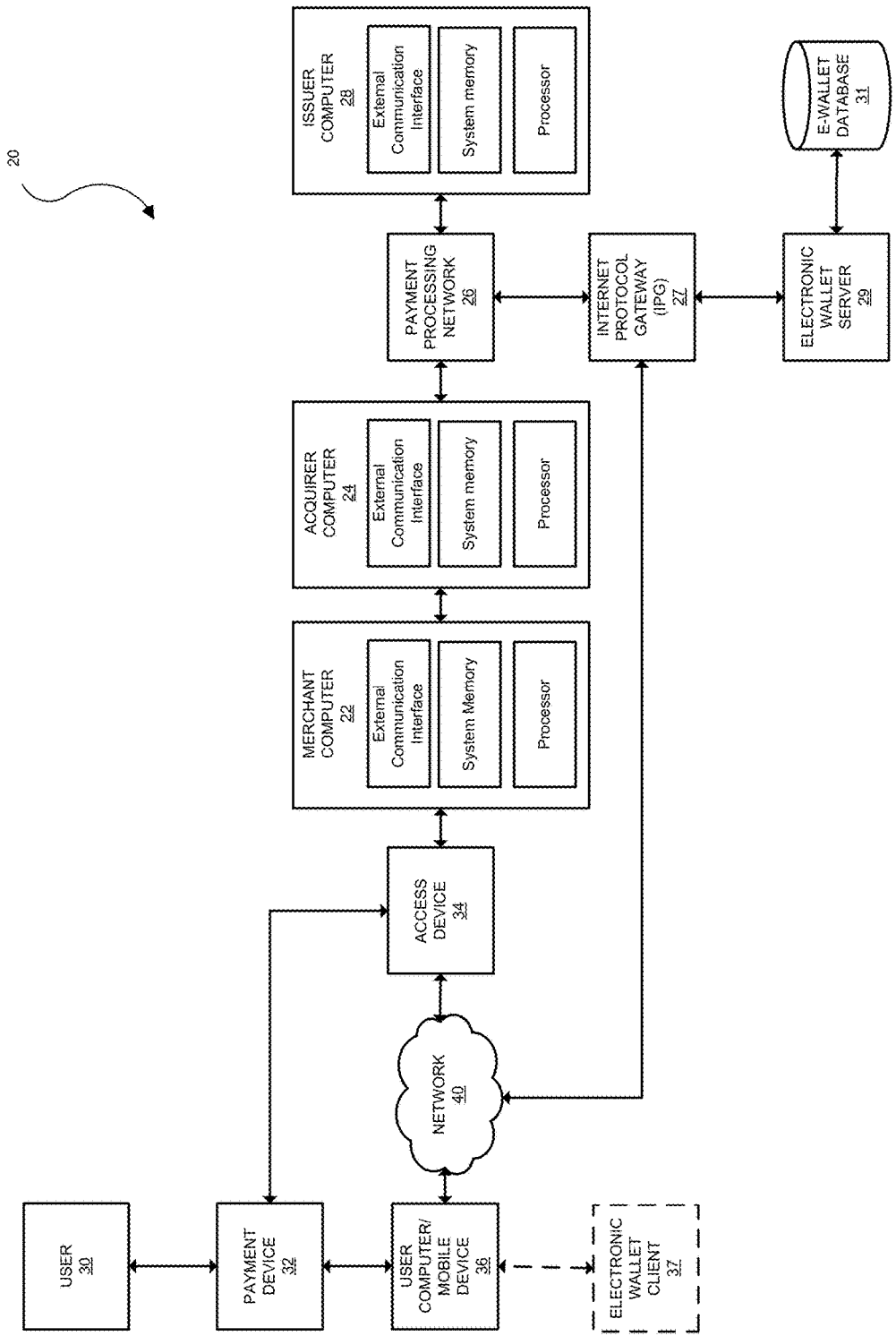
FIG. 18 shows a block diagram of a system according to some embodiments provided herein.

An exemplary financial transaction system is shown in FIG. 18. The system 20 may include one or more merchants, one or more access devices 34, one or more payment devices 32, one or more acquirers, and one or more issuers. For example, the system 20 may include a merchant having a merchant computer 22 that comprises an external communication interface (e.g. for communicating with an access device 34 and an acquirer 24), system memory comprising one or modules to generate and utilize electronic messages, and a data processor (for facilitating a financial transaction and the exchange of electronic messages); an acquirer having an acquirer computer 24 that comprises an external communication interface (e.g. for communicating with a merchant computer 22 and a payment processing network 26), system memory comprising one or modules to generate and utilize electronic messages, and a data processor (for facilitating a financial transaction and the exchange of electronic messages); and an issuer having an issuer computer 28 that comprises an external communication interface (e.g. for communicating with a payment processing network 26), system memory comprising one or modules to generate and utilize electronic messages, and a data processor (for facilitating a financial transaction and the exchange of electronic messages). The external communication interface of the merchant computer 22 may be coupled to an access device 34 (such that information may be received by the access device 34 and communicated to the merchant computer 22) or, in some embodiments, the access device 34 may comprise a component of the merchant computer 22.

As used in this context, an "external communication interface" may refer to any hardware and/or software that enables data to be transferred between two or components of system 20 (e.g., between devices residing at locations such as an issuer, acquirer, merchant, payment processing network 26, etc.). Some examples of external communication interfaces may include a modem, a network interface (such as an Ethernet card), a communications port, a Personal Computer Memory Card International Association (PCMCIA) slot and card, or the like. Data transferred via external communications interface may be in the form of signals which may be electrical, electromagnetic, optical, or any other signal capable of being received by the external communications interface (collectively referred to as "electronic signals" or "electronic messages"). These electronic messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable method.

As would be understood by one of ordinary skill in the art, any suitable communications protocol for storing, representing, and transmitting data between components in the system 20 may be used. Some examples of such methods may include utilizing predefined and static fields (such as in core TCP/IP protocols); "Field: Value" pairs (e.g. HTTP, FTP, SMTP, POP3, and SIP); an XML based format; and/or Tag-Length-Value format.

As shown in the exemplary system 20 in FIG. 18, information from the payment device 32 may be provided to access device 34 either directly (e.g. through a contact or contactless interface) or indirectly thorough a user computer or mobile device 36 (e.g. in an e-commerce environment or other indirect transaction) via network 40 (such as the Internet). In some embodiments, the user computer or mobile device 36 may interact with the payment processing network 26 (or other entity in the system 20) via the network 40 to form a first communications channel, such as through an Internet Protocol Gateway (IPG) 27. The IPG 27 may be in operative communication with the payment processing network 26. Although the IPG 27 is shown as being a separate entity in FIG. 18, the IPG 27 could be incorporated into the payment processing network 26, or could be omitted from the system 20. In the latter situation, the first communications channel could directly connect the payment processing network 26 and the user computer or mobile device 36. In general, providing communication from the user 30 to the payment processing network or other entity may enable a variety of increased functionalities to the user 30, such as advanced authentication and verification methods (particularly in e-commerce and similar transactions), examples of which are described in U.S. Ser. No. 12/712,148 filed on Jul. 16, 2010 and U.S. Ser. No. 13/184,080 filed on Jul. 15, 2011, each of which is incorporated by reference herein in its entirety. However, embodiments are not so limited.

In some embodiments, an electronic or digital wallet (i.e. "e-Wallet") may be utilized as a payment device for conducting a financial transaction. As shown in FIG. 18, such exemplary systems may comprise an electronic wallet server 29, which may be accessible to the user 30 via network 40 (either directly connected or through an IPG 27) and may also be in operational communication with a merchant and/or with a payment processing network 26 (or in some embodiments, the electronic wallet server 29 may comprise a part of the payment processing network 26). The electronic wallet server 29 may be programmed or configured to provide some or all of the functionality associated with conducting transactions using an electronic wallet, including maintaining an association between the user's e-wallet and one or more payment accounts (such as a bank account or credit card account) in E-Wallet database 31. To provide electronic wallet services (i.e. the use of the electronic wallet associated with a payment account to conduct a financial transaction), the electronic wallet server 29 may further provide a web interface (e.g. through one or more web pages) to receive and transmit requests for payments services and/or may provide an application program interface (API) (shown as electronic wallet client 37) at the user computer apparatus 36 to provide the web service. This process is described in more detail in U.S. Ser. No. 61/466,409 filed on Mar. 22, 2011, which is incorporated herein by reference in its entirety.

As noted above, the user's electronic wallet may be stored in the E-Wallet database 31, which may include information associated with the user's payment accounts can be used in conducting a financial transaction with a merchant. For example, the E-Wallet database 31 may include the primary account numbers of one or more payment accounts (e.g., payment accounts associated with a credit card, debit card, etc.) of the user 30. The e-wallet may be populated with such information during an initial enrollment process in which the user 30 enters information regarding one or more of the payment accounts that may be associated with various issuers. Once the payment account information is added to the E-Wallet database 31, the user 30 may perform transactions by utilizing only his e-wallet. When a user 30 performs a transaction using his electronic wallet, the user 30 need not provide the merchant with payment account information, but may instead provide the electronic wallet information. This information may then be included in an authorization request message, which in turn may be provided to payment processing network 26. The payment processing network 26 may then access the user's e-wallet via a request to the electronic wallet server 29, or may have direct access to the e-wallet database 31 so as to obtain the corresponding payment account information indicated by the information in the authorization request message.

The electronic wallet client 37 may comprises any suitable software that provides front end functionality of the electronic wallet to the user 30. For example, the electronic wallet client 37 may be embodied as a software application downloadable by a computer apparatus or mobile device 32 (e.g., a mobile phone). In some instances, the electronic wallet client 37 may provide a user interface (such as a series of menus or other elements) that allows the user 30 to manage his electronic wallet(s) (i.e. the electronic wallet client 37 may enable interaction with the electronic wallet server 29, and thereby the e-wallet database 31). In some embodiments, the electronic wallet client 37 may store data in a computer readable memory for later use, such as user 30 preferences or identifiers associated with funding sources added to the electronic wallet.

A payment processing network 26 may be disposed between the acquirer computer 24 and the issuer computer 28 in the system 20. The components of an exemplary payment processing network 26 are described below with reference to FIG. 19 for illustration purposes. Furthermore, the merchant computer 22, the acquirer computer 24, the payment processing network 26, and the issuer computer 28 may all be in operative communication with each other (i.e. although not depicted in FIG. 18, one or more communication channels may exist between each of the entities, whether or not these channels are used in conducting a financial transaction).

The payment processing network 26 may include data processing subsystems, networks, and operations used to support and deliver authorization services, exception file services, and clearing and settlement services. For example, the payment processing network 26 may comprise a server computer, coupled to a network interface (e.g. by an external communication interface), and a database(s) of information. An exemplary payment processing network may include VisaNet™, CYBERSOURCE, AUTHORIZE.NET, PLAY-SPAN, etc. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 26 may use any suitable wired or wireless network, including the Internet.

Although many of the data processing functions and features of some embodiments may be present in the payment processing network 26 (and a server computer therein), it should be understood that such functions and features could be present in other components such as the issuer computer 28, and need not be present in the payment processing network 26, or a server computer therein.

Figure 19:
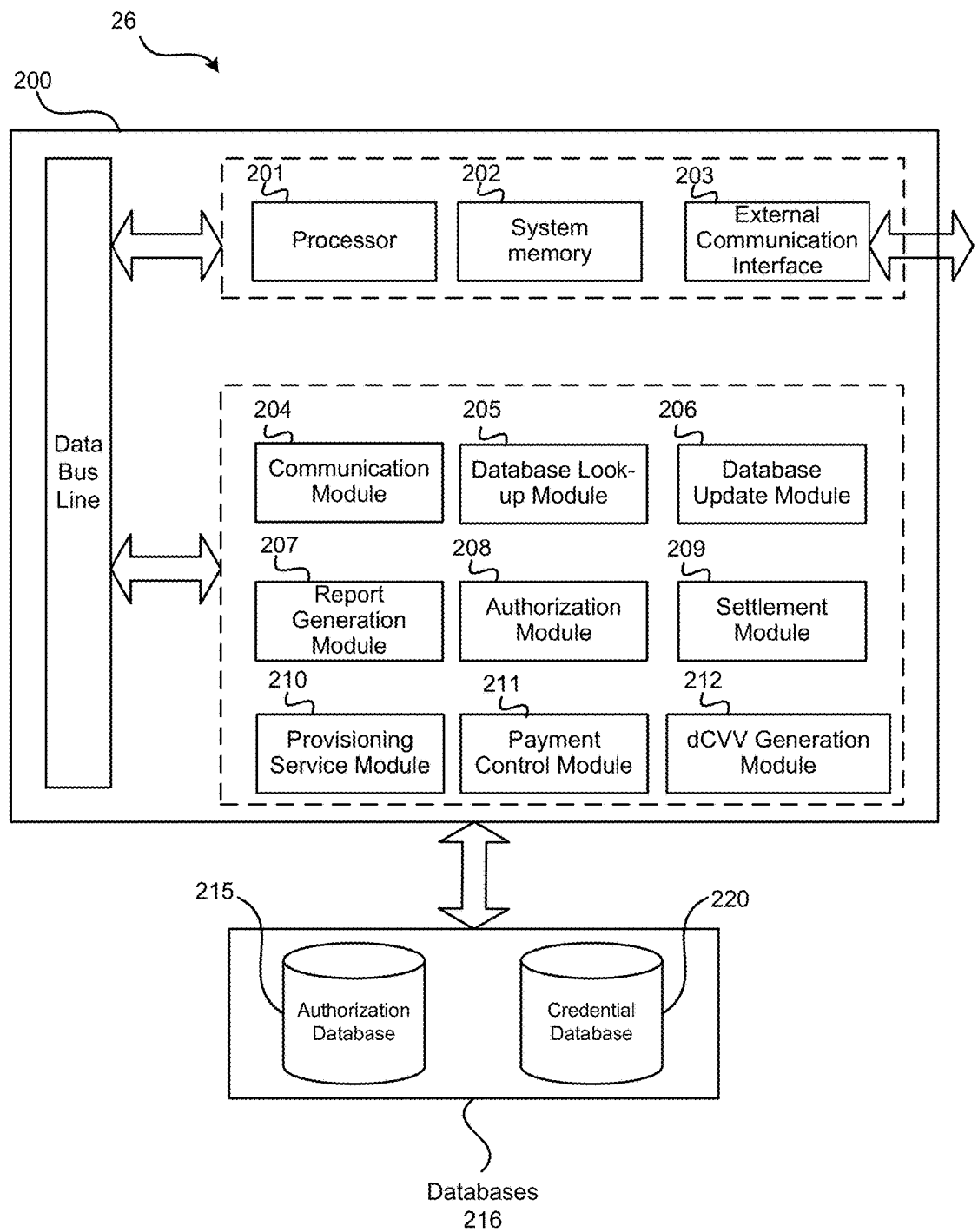
FIG. 19 shows a block diagram of an exemplary system comprising a server computer in accordance with some embodiments.

With reference to FIG. 19, an exemplary server computer 200 in payment processing network 26 is shown. The exemplary server computer 200 is illustrated as comprising a plurality of hardware and software modules (201-209). However, it should be appreciated that this is provided for illustration purposes only, and each of the modules and associated functionality may be provided and/or performed by the same or different components. That is, exemplary server computer 200 may, for example, perform some of the relevant functions and steps described herein with reference to the payment processing network 26 through the use of any suitable combination of software instructions and/or hardware configurations. It should be noted that although FIG. 19 illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s).

The exemplary server 200 is shown as comprising a processor 201, system memory 202 (which may comprise any combination of volatile and/or non-volatile memory such as, for example, buffer memory, RAM, DRAM, ROM, flash, or any other suitable memory device), and an external communication interface 203. Moreover, one or more of the modules 204-209 may be disposed within one or more of the components of the system memory 202, or may be disposed externally. As was noted above, the software and hardware modules shown in FIG. 19 are provided for illustration purposes only, and the configurations are not intended to be limiting. The processor 201, system memory 202 and/or external communication interface 203 may be used in conjunction with any of the modules described below to provide a desired functionality. Some exemplary modules and related functionality may be as follows:

The communication module 204 may be configured or programmed to receive and generate electronic messages comprising information transmitted through the system 20 to or from any of the entities shown in FIG. 18. When an electronic message is received by the server computer 200 via external communication interface 203, it may be passed to the communications module 204. The communications module 204 may identify and parse the relevant data based on a particular messaging protocol used in the system 20. The received information may comprise, for instance, identification information, transaction information, and/or any other information that the payment processing network 26 may utilize in authorizing a financial transaction or performing a settlement and clearing procedure. The communication module 204 may then transmit any received information to an appropriate module within the server computer 200 (e.g. via a system bus line 250). The communication module 204 may also receive information from one or more of the modules in server computer 200 and generate an electronic message in an appropriate data format in conformance with a transmission protocol used in the system 20 so that the message may be sent to one or more components within the system 20 (e.g. to an issuer computer 28 or merchant computer 22). The electronic message may then be passed to the external communication interface 203 for transmission. The electronic message may, for example, comprise an authorization response message (e.g. to be transmitted to a merchant conducting a transaction) or may be an authorization request message to be transmitted or forwarded to an issuer.

The database look-up module 205 may be programmed or configured to perform some or all of the functionality associated with retrieving information from one or more databases 216. In this regard, the database look-up module 205 may receive requests from one or more of the modules of server 200 (such as communication module 204, authorization module 208, or settlement module 209) for information that may be stored in one or more of the databases 216. The database look-up module 205 may then determine and a query an appropriate database. The database update module 206 may be programmed or configured to maintain and update the databases 216, such as authorization database 215. In this regard, the database update module 206 may receive information about a user, financial institution, a payment device, and/or current or past transaction information from one of the modules discussed herein. This information may then be stored in the appropriate location in the database 210 using any suitable storage process.

The report generation module 207 may be programmed or configured to perform some or all of the functionality associated with generating a report regarding a user, an account, a transaction or transactions, or any other entity or category of information with regard to system 20. This may include, for instance, identifying patterns (such as patterns that indicate a fraudulent transaction or transactions) and generating one or more alerts that may be sent (e.g. via communication module 204 and external communication interface 203) to one or more entities in the system 20, including the user, merchant, or issuer. The report generation module may also, for example, request information from one or more of the databases 216 via database look-up module 205.

The authorization module 208 may be configured or programmed to perform some or all the functionality associated with authorizing a financial transaction associated with an authorization request message. The authorization request message may be generated by a merchant computer 22 and may be associated with a transaction involving the payment device 32. The authorization request message may include any suitable information that may be used to authorize or identify the transaction, and may be generated by the merchant computer 22 in response to an interaction between a payment device 32 or a mobile device 36 and an access device 34). The authorization module 208 may, for instance, be programmed or configured to compare the information received by via the authorization request message with stored information at the server 200 or a database 210 (such as comprising verification values). In some embodiments, if the received and stored values match, the authorization module 208 may authorize the transaction (or may be more likely to authorize the transaction) and may instruct the communication module 201 to generate an authorization response message. The authorization module 207 may also be programmed or configured to execute any further operations associated with a typical authorization. As shown in FIG. 19, various additional modules 210-212 may also be present in the server computer 200. For example, as described above with respect to FIG. 1, the payment processing network may include a provisioning service module 210 that can securely connect to one or more mobile devices to provide or update tokens stored on the mobile devices. The payment processing network may also include a payment control module 211 which, as described above, can be used to place limits on tokens, such as lifecycle limits, spending limits, etc. The payment processing network may also include a dCVV generation module 212 which, as described above, may be used to generate dynamic identification information for a transaction that uses a token.

The payment processing network 26 may include one or more databases 216, such as authorization database 215. Each of the databases shown in this example may comprise more than one database, and may be located in the same location or at different locations. The authorization database 215 may contain information related to a payment device 32 and/or a payment account, as well as any other suitable information (such as transaction information) associated with the payment account. For example, the authorization database 215 may comprise a relational database having a plurality of associated fields, including a primary account identifier (e.g. a PAN), an issuer associated with the account, expiration date of a payment device 32, a verification value(s), an amount authorized for a transaction, a user name, user contact information, prior transaction data, etc. In some embodiments, the authorization module 208 may utilize some or all of the information stored in the authorization database 215 when authorizing a transaction.

The databases 216 may also comprise a number of additional databases. For example, as described above with respect to FIG. 1, the payment processing network may maintain a credential database 220 that includes device information, account information, and other credentials that can be used for authentication and validation.

IX. Exemplary Methods

Figure 20:
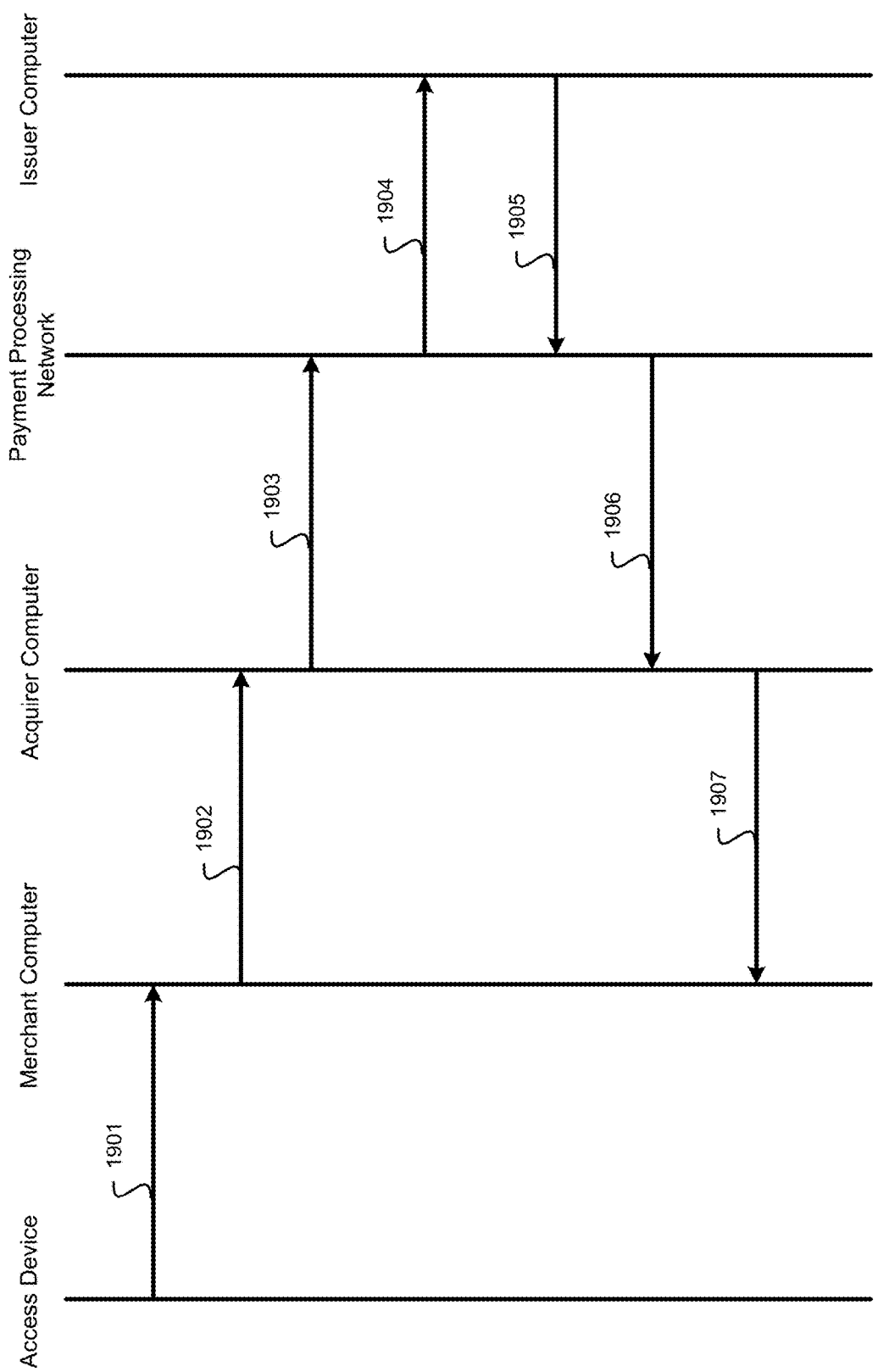
FIG. 20 shows an exemplary diagram of a financial transaction in accordance with some embodiments.

Methods for example financial transaction systems 20 are described below with reference to FIG. 20, and with further reference to the system elements in FIGS. 18 and 19. The methods described below are exemplary in nature, and are not intended to be limiting. Methods in accordance with some embodiments described herein may include (or omit) some or all of the steps described below, and may include steps in a different order than described herein.

A typical credit card transaction flow using a payment device 32 at an access device 34 (e.g. POS location) can be described as follows. (Note that embodiments of the invention are not limited to credit card transactions, but may also include other types of payment transactions including pre-paid and debit transactions). A user 30 presents his or her payment device 32 to an access device 34 to pay for an item or service. The payment device 32 and the access device 34 interact such that information from the payment device 32 (e.g. PAN, PAN substitute (token), verification value(s), expiration date, etc.) is received by the access device 34 (e.g. via contact or contactless interface). As shown in FIG. 20, the merchant computer 22 may then receive this information at step 401 from the access device 34 via the external communication interface. The merchant computer 22 may then generate an authorization request message that includes the information received from the access device 34 (i.e. information corresponding to the payment device 32) along with additional transaction information (e.g. a transaction amount, merchant specific information, etc.) and at step 402 electronically transmit this information to an acquirer computer 24. The acquirer typically represents, and vouches for, the merchant in financial transactions (e.g. credit card transactions). The acquirer computer 24 may then receive (via its external communication interface), process, and at step 403 forward the authorization request message to a payment processing network 26 (such as the server computer 200 shown in FIG. 19), for authorization.

In general, prior to the occurrence of a credit-card transaction, the payment processing network 26 has an established protocol with each issuer on how the issuer's transactions are to be authorized. In some cases, such as when the transaction amount is below a threshold value, the authorization module 208 of the payment processing network 26 may be configured to authorize the transaction based on information that it has about the user's account without generating and transmitting an authorization request message to the issuer computer 28. In other cases, such as when the transaction amount is above a threshold value, the payment processing network 26 may receive the authorization request message via its external communication interface 203, determine the issuer associated with the payment device 32, and then at step 404 forward the authorization request message for the transaction to the issuer computer 28 for verification and authorization. As part of the authorization process, the payment processing network 26 or the issuer computer 28 may analyze a verification value or other datum provided by the payment device 32. The verification value may be stored at the issuer or the payment processing network 26 (e.g. in one of the databases 216). Once the transaction is authorized, at step 405 the issuer computer 28 may generate an authorization response message (that may include an authorization code indicating the transaction is approved or declined) and transmit this electronic message via its external communication interface to payment processing network 26. At step 406, the payment processing network 26 may then forward the authorization response message via a communication channel to the acquirer computer 24, which in turn at step 407 may then transmit the electronic message to comprising the authorization indication to the merchant computer 22.

In the credit card industry, the authorization indication typically takes the form of an authorization code, which is five or six alphanumeric characters, by convention. It serves as proof to the merchant and the card holder that the issuing bank or payment processing network has authorized the transaction, and may be used by the merchant or the card holder as proof of authorization if the issuing bank later disputes the transaction, such as during settlement. The authorization code is not the same as the card verification value (or the dCVV value described below) because it does not have the same purpose as the card verification value, which is to serve as proof that the card was presented to the merchant when the transaction was conducted, and cannot be entered into the CVV field of a merchant POS terminal or merchant website (which only accepts 3 or 4 numeric digits). The authorization code is also not the same as a 3-D Secure datum since it does not have the same purpose as the 3-D Secure datum, which is to serve as proof that the card was presented to the merchant when the transaction was conducted.

When a user 30 wishes to make an online purchase with a merchant over the Internet (i.e. e-commerce), a similar method as described above with reference to FIG. 20 may be performed except that the user 30 may use his computer apparatus or mobile device 36 to provide information associated with a payment device 32 (e.g. account number, user's name, expiration date, verification value, etc.) into respective fields on the merchant's checkout page (e.g. functioning as an access device 34). The access device 34 may then provide this information to the merchant computer 22, and steps 401-407 may be performed.

X. Exemplary Payment Devices

Provided below are descriptions of some devices (and components of those devices) that may be used in the systems and methods described above. These devices may be used, for instance, to receive, transmit, process, and/or store data related to any of the functionality described above. As would be appreciated by one of ordinary skill in the art, the devices described below may have only some of the components described below, or may have additional components.

Figure 21:
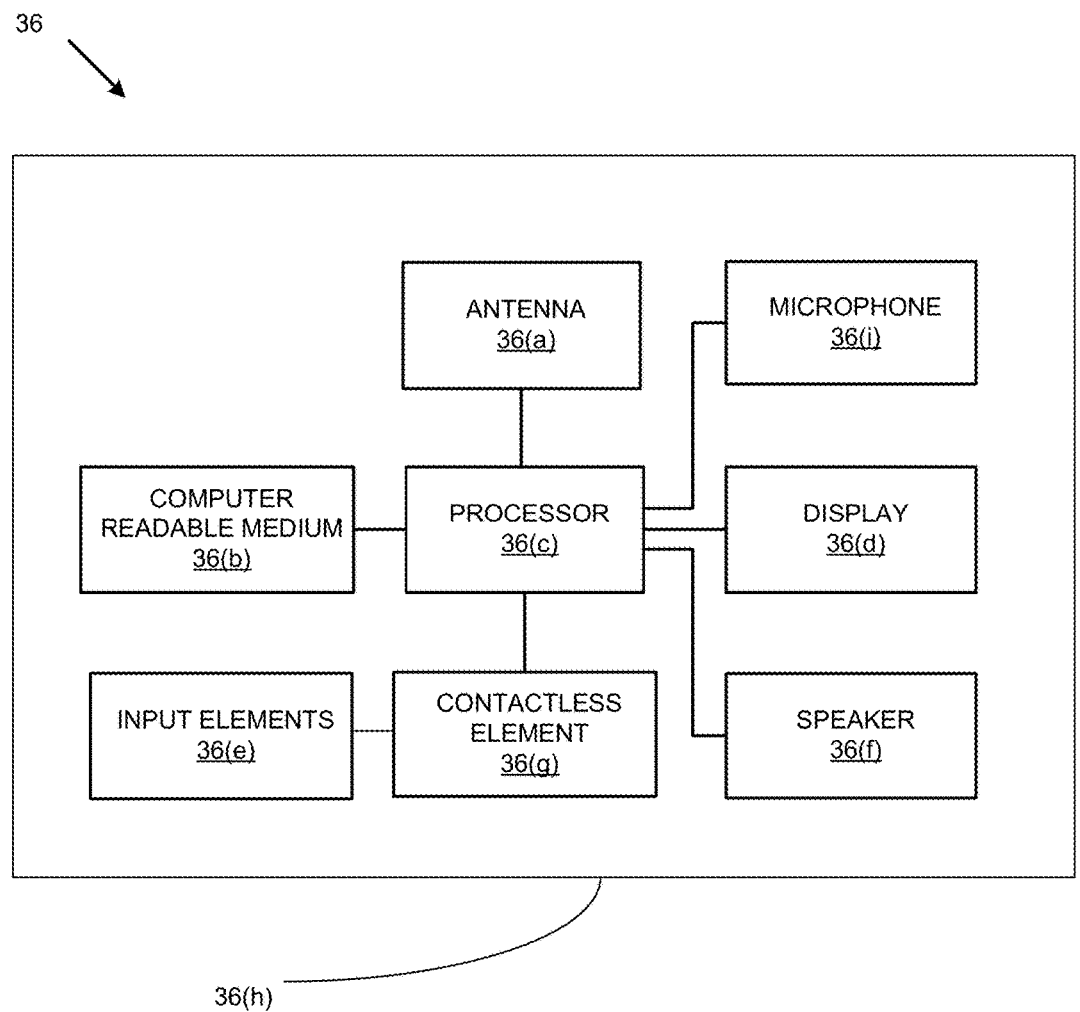
FIG. 21 shows an exemplary mobile device in accordance with some embodiments provided herein.

With reference to FIG. 21, a block diagram of an exemplary mobile device 36 is shown that may be used in some embodiments. In some embodiments, the mobile device 36 may be a notification device that can receive alert messages, a payment device that can be used to make payments, an access device (e.g. POS device) that may receive information from a consumer to conduct a transaction, and/or a multi-purpose general use device. The exemplary mobile device 36 may comprise a computer readable medium 36(b) that be present within the body (or outer casing) 36(h), or the computer readable medium 36(b) could be detachable from the device (e.g. the computer readable medium 36(b) could comprise an external memory that could be connected through a physical interface such as a USB connection, or the data could be hosted remotely and accessed wirelessly by the device—e.g. the data could be hosted and stored at a remoter server in the "cloud"). The computer readable medium 36(b) may be in the form of a memory that stores data. The memory may store information such as financial information, transit information (e.g., as in a subway or train pass), access information (e.g., access badges), serial numbers, mobile account information, and any other suitable information. In general, any of this information may be transmitted by the mobile device 36 (such as to an access device 34), via any suitable method, including the use of antenna 36(a) or contactless element 36(g). The body 36(h) may be in the form a plastic substrate, housing, or other structure.

In some embodiments, the mobile device 36 may further include a contactless element 36(g), which is typically implemented in the form of a semiconductor chip (or other data storage element) with an associated wireless transfer (e.g., data transmission) element, such as an antenna. Contactless element 36(g) may be coupled to (e.g., embedded within) the mobile device 36 and data or control instructions that are transmitted via a cellular network may be applied to the contactless element 36(g) by means of a contactless element interface (not shown). The contactless element interface functions to permit the exchange of data and/or control instructions between the mobile device circuitry and an optional contactless element 36(g), or between another device having a contactless element (e.g. a POS terminal or a payment device). Contactless element 36(g) may be capable of transferring and receiving data using a short range wireless communication capability. As noted above, mobile device 36 may comprise components to both be the interrogator device (e.g. receiving data) and the interrogated device (e.g. sending data). Thus, the mobile device 36 may be capable of communicating and transferring data or control instructions via both cellular network (or any other suitable wireless network—e.g. the Internet or other data network) and short range communications.

The mobile device 36 may also include a processor 36(c) (e.g., a microprocessor) for processing the functions of the phone 36 and a display 36(d) to allow a consumer to see phone numbers and other information and messages. The mobile device 36 may further include input elements 36(e) to allow a user to input information into the device, a speaker 36(f) to allow the user to hear voice communication, music, etc., and a microphone 36(i) to allow the user to transmit her voice through the mobile device 36. The mobile device 36 may also include an antenna 36(a) for wireless data transfer (e.g., data transmission).

Figure 22:
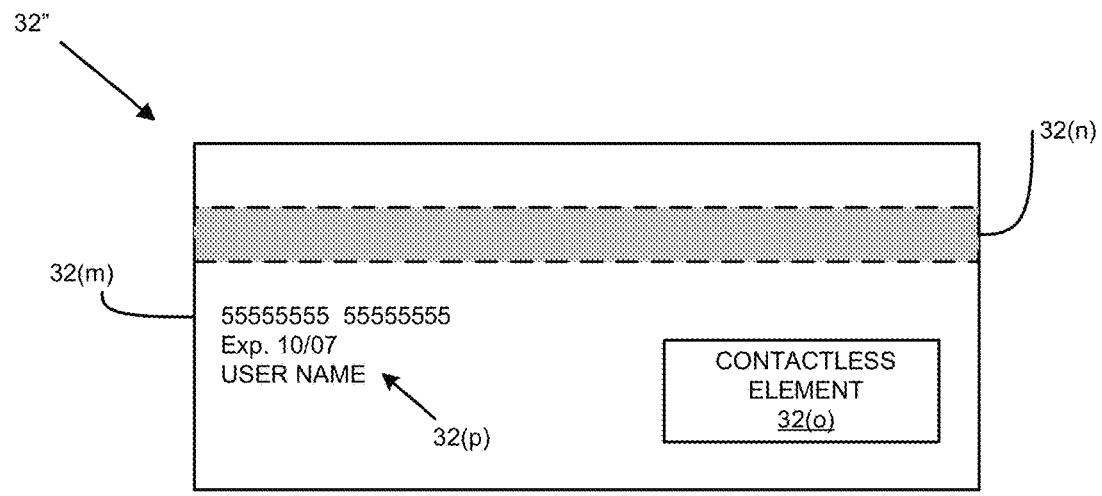
FIG. 22 shows an exemplary payment device in the form of card in accordance with some embodiments.

FIG. 22 shows an example of a payment device 32" in the form of a card. As shown, the payment device 32" comprises a plastic substrate 32(m). In some embodiments, a contactless element 32(o) for interfacing with an access device 34 may be present on, or embedded within, the plastic substrate 32(m). Consumer information 32(p) such as an account number, expiration date, and/or a user name may be printed or embossed on the card. A magnetic stripe 32(n) may also be on the plastic substrate 32(m). In some embodiments, the payment device 32" may comprise a microprocessor and/or memory chips with user data stored in them.

As noted above and shown in FIG. 22, the payment device 32" may include both a magnetic stripe 32(n) and a contactless element 32(o). In some embodiments, both the magnetic stripe 32(n) and the contactless element 32(o) may be in the payment device 32". In some embodiments, either the magnetic stripe 32(n) or the contactless element 32(o) may be present in the payment device 32".

XI. Subsystems and Components

The various participants and elements described herein may operate one or more computer apparatuses to facilitate the functions described herein. Any of the elements in the above-described Figures, including any servers or databases, may use any suitable number of subsystems to facilitate the functions described herein.

Figure 23:
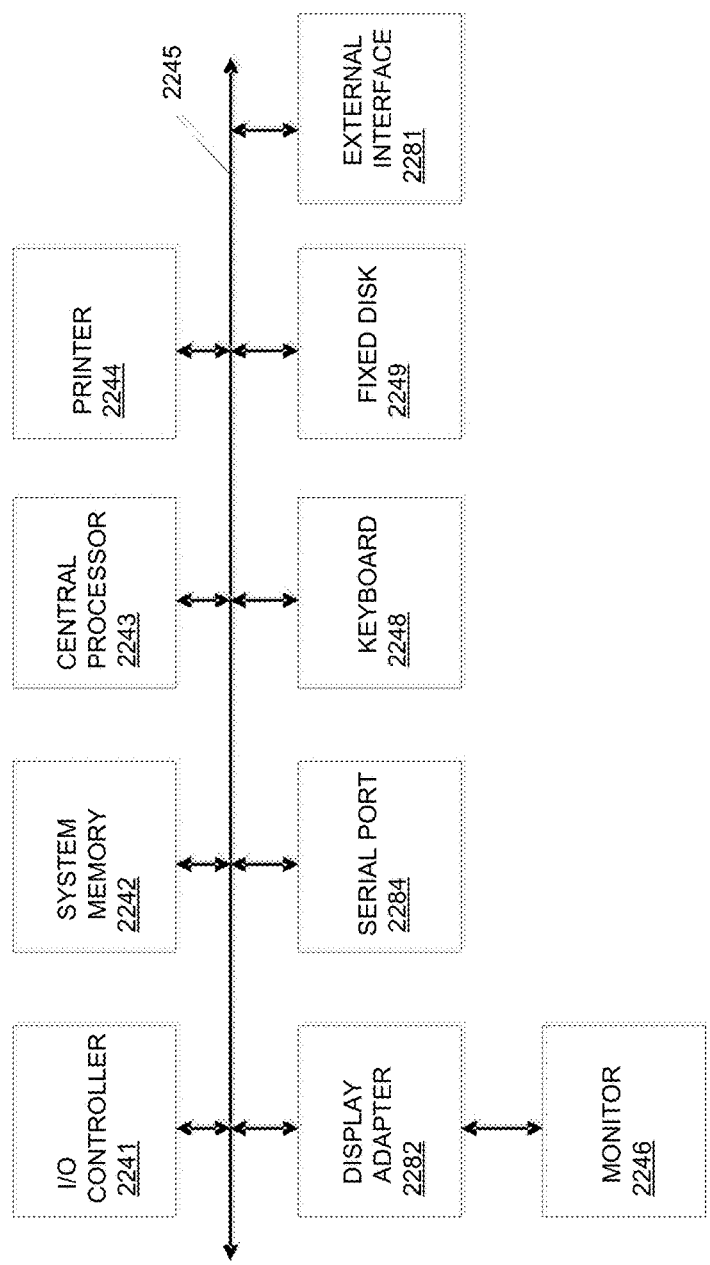
FIG. 23 shows examples of subsystems or components.

Examples of such subsystems or components are shown in FIG. 23. The subsystems shown in FIG. 28 are interconnected via a system bus 445. Additional subsystems such as a printer 444, keyboard 448, fixed disk 449 (or other memory comprising computer readable media), monitor 446, which is coupled to display adapter 482, and others are shown. Peripherals and input/output (I/O) devices, which couple to I/O controller 441 (which can be a processor or other suitable controller), can be connected to the computer system by any number of means known in the art, such as serial port 484. For example, serial port 484 or external interface 481 can be used to connect the computer apparatus to a wide area network such as the Internet, a mouse input device, or a scanner. The interconnection via system bus allows the central processor 443 to communicate with each subsystem and to control the execution of instructions from system memory 442 or the fixed disk 449, as well as the exchange of information between subsystems. The system memory 442 and/or the fixed disk 449 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for providing tokens to a first mobile device and a second mobile device, wherein the first mobile device comprises a secure element and a memory and is associated with a first user, and wherein the second mobile device comprises memory and does not include a secure element, the method comprising:

receiving, by a server, a first token request from the first mobile device, wherein the token request comprises an identifier of the first mobile device;

determining, by the server, based on the identifier for the first mobile device, that the first mobile device comprises the secure element;

based on the determining that the first mobile device has the secure element, generating, by the server, a first token and mapping the first token to an account identifier of the first user;

writing, by the server, the generated first token to the secure element of the first mobile device;

receiving, by the server, a second token request from the second mobile device, wherein the second token request comprises an identifier of the second mobile device;

determining, by the server, based on the identifier of the second mobile device that the second mobile device does not comprise a secure element;

based on the determination that the second mobile device does not contain a secure element, generating by the server, a time-to-live token; and sending, by the server, the generated time-to-live token to the second mobile device.

2. The method of claim 1, further comprising:
sending, by the server, the first token to a provisioning service.

3. The method of claim 1, further comprising:
persisting, by the server, first device information associated with the first mobile device in a credential database in a payment processing network, wherein the first device information is included with the first token request.

4. The method of claim 1, wherein the server further comprises a token rules generation module comprising rules for generating specific token types, token formats, and security and storage requirements for the tokens.

5. The method of claim 1, further comprising:
receiving, by the server, a registration request for the first mobile device.

6. The method of claim 1, wherein the first mobile device and the second mobile device are a first mobile phone and a second mobile phone, respectively.

7. The method of claim 1, wherein the server is part of a tokenization hub.

8. The method of claim 1, wherein the server comprises rules that allow the server computer to manage lifecycle management of the time to live token.

9. The method of claim 1, wherein the method further comprises:

receiving, by the server, a de-tokenization request;
providing, by the server, the de-tokenization request to a tokenization module in the server;
receiving, by the server, the account identifier from the tokenization module; and
providing, by the server, a de-tokenization response with the account identifier in response to the de-tokenization request.

10. The method of claim 1, wherein the first token request includes an alias for a primary account number.

11. The method of claim 1, wherein the first token request comprises an alias for a primary account number, device information, and a purchase amount for a transaction.

* * * * *